(12) United States Patent
Geis et al.

(10) Patent No.: US 11,614,855 B2
(45) Date of Patent: *Mar. 28, 2023

(54) MANAGING LANDBASES AND MACHINE OPERATIONS PERFORMED THEREON

(71) Applicant: Genesis Industries, LLC., Arcadia, LA (US)

(72) Inventors: Chad W. Geis, Choudrant, LA (US); Dallas L. Geis, Ruston, LA (US)

(73) Assignee: GENESIS INDUSTRIES, LLC, Arcadia, LA (US)

( * ) Notice: Subject to any disclaimer, the term of this patent is extended or adjusted under 35 U.S.C. 154(b) by 116 days.

This patent is subject to a terminal disclaimer.

(21) Appl. No.: 17/005,668

(22) Filed: Aug. 28, 2020

(65) Prior Publication Data

US 2021/0042016 A1 Feb. 11, 2021

Related U.S. Application Data

(63) Continuation of application No. 15/376,465, filed on Dec. 12, 2016, now Pat. No. 10,795,556, which is a
(Continued)

(51) Int. Cl.
*G06F 3/04842* (2022.01)
*G06Q 10/06* (2012.01)
(Continued)

(52) U.S. Cl.
CPC ......... *G06F 3/04842* (2013.01); *A01G 23/00* (2013.01); *A01G 23/006* (2013.01);
(Continued)

(58) Field of Classification Search
CPC .......................... G06F 3/04842; G06F 3/0488
See application file for complete search history.

(56) References Cited

U.S. PATENT DOCUMENTS

| | | | |
|---|---|---|---|
| 4,114,666 A | 9/1978 | Bruun | |
| 5,544,052 A | 8/1996 | Fujita et al. | |
| | (Continued) | | |

FOREIGN PATENT DOCUMENTS

| | | |
|---|---|---|
| CA | 2638423 | 11/2009 |
| EP | 1024688 B1 | 4/2003 |

OTHER PUBLICATIONS

"Timbermatic 300 Control and measuring system ver 2.3.5", Operator's Manual, Worldwide Construction and Forestry Division, 190 pages. Copy right 2006. (Submitting 2 files).
(Continued)

*Primary Examiner* — William L Bashore
*Assistant Examiner* — Nathan K Shrewsbury
(74) *Attorney, Agent, or Firm* — Goodhue, Coleman & Owens, P.C.

(57) ABSTRACT

A method for management of a land base includes interfacing a machine or equipment to a computer running a geographical information system (GIS) application such that the computer is configured to monitor the operations performed by the equipment or machine on the land base and store the operations as map points, lines, or polygons on at least one data layer within the GIS application. The method further includes displaying the GIS application to the operator at the point and time of performing the operations.

19 Claims, 21 Drawing Sheets

Related U.S. Application Data continuation of application No. 14/152,635, filed on Jan. 10, 2014, now Pat. No. 9,519,411, which is a continuation of application No. 12/118,417, filed on May 9, 2008, now Pat. No. 9,235,334.

(51) Int. Cl.

| | |
|---|---|
| *G06Q 50/02* | (2012.01) |
| *G06F 3/0488* | (2022.01) |
| *A01G 23/00* | (2006.01) |
| *A01G 23/081* | (2006.01) |
| *B60K 35/00* | (2006.01) |
| *B60Q 9/00* | (2006.01) |
| *G06F 3/04847* | (2022.01) |
| *G06F 3/04886* | (2022.01) |
| *G06Q 50/16* | (2012.01) |

(52) U.S. Cl.
CPC ............ *A01G 23/081* (2013.01); *B60K 35/00* (2013.01); *B60Q 9/00* (2013.01); *G06F 3/0488* (2013.01); *G06F 3/04847* (2013.01); *G06F 3/04886* (2013.01); *G06Q 10/06* (2013.01); *G06Q 50/02* (2013.01); *G06Q 50/163* (2013.01)

(56) References Cited

U.S. PATENT DOCUMENTS

| | | | |
|---|---|---|---|
| 5,894,323 A | 4/1999 | Kain et al. | |
| 6,016,713 A | 1/2000 | Hale | |
| 6,182,725 B1 | 2/2001 | Sörvik | |
| 6,229,546 B1 | 5/2001 | Lancaster et al. | |
| 6,236,907 B1 | 5/2001 | Hauwiller et al. | |
| 6,247,019 B1 | 6/2001 | Davies | |
| 6,263,343 B1 | 7/2001 | Hirono | |
| 6,314,370 B1 | 11/2001 | Curtright | |
| 6,337,971 B1* | 1/2002 | Abts ...................... H04L 67/12 | 331/65 |
| 6,341,632 B1 | 1/2002 | Sorvik | |
| 6,421,610 B1 | 7/2002 | Carroll et al. | |
| 6,525,276 B1 | 2/2003 | Vellidus et al. | |
| 6,578,610 B2 | 6/2003 | Ristolainen | |
| 6,708,114 B1 | 3/2004 | Milligan | |
| 7,096,092 B1 | 8/2006 | Ramakrishnan et al. | |
| 7,100,647 B2 | 9/2006 | Carlsson et al. | |
| 7,184,892 B1 | 2/2007 | Dyer et al. | |
| 7,212,670 B1 | 5/2007 | Rousselle et al. | |
| 7,218,975 B2 | 5/2007 | Stevens et al. | |
| 8,042,300 B2* | 10/2011 | Bigelow ................ A01G 23/00 | 111/923 |
| 8,364,440 B2* | 1/2013 | Putkonen ............. G06Q 10/06 | 702/182 |
| 2002/0082982 A1 | 6/2002 | Mock et al. | |
| 2002/0161685 A1 | 10/2002 | Dwinnell | |
| 2003/0023412 A1 | 1/2003 | Rappaport et al. | |
| 2003/0139983 A1 | 7/2003 | Spencer et al. | |
| 2003/0220734 A1 | 11/2003 | Harrison et al. | |
| 2004/0073556 A1 | 4/2004 | Wood et al. | |
| 2004/0133347 A1 | 7/2004 | Britt | |
| 2004/0250908 A1 | 12/2004 | Hicks | |
| 2005/0055233 A1 | 3/2005 | Wenzlau et al. | |
| 2005/0096849 A1 | 5/2005 | Sorrells | |
| 2005/0240329 A1 | 10/2005 | Hirota | |
| 2006/0125828 A1 | 6/2006 | Harrison et al. | |
| 2006/0197763 A1 | 9/2006 | Harrison et al. | |
| 2006/0265342 A1 | 11/2006 | Froyland et al. | |
| 2006/0271262 A1 | 11/2006 | McLain | |
| 2006/0271563 A1 | 11/2006 | Angelo et al. | |
| 2006/0282299 A1 | 12/2006 | Avey et al. | |
| 2007/0195011 A1 | 8/2007 | Hatori et al. | |
| 2008/0015799 A1* | 1/2008 | Lalla ..................... G01F 1/8431 | 702/65 |
| 2008/0021680 A1 | 1/2008 | Elsberg et al. | |
| 2008/0070227 A1 | 3/2008 | Rauch | |
| 2008/0109196 A1 | 5/2008 | Remme et al. | |
| 2008/0128138 A1 | 6/2008 | Radi | |
| 2008/0157990 A1 | 7/2008 | Belzer et al. | |
| 2008/0236463 A1* | 10/2008 | Bigelow ................ A01G 23/00 | 111/200 |
| 2008/0257569 A1* | 10/2008 | Foster .................. A01B 63/145 | 172/7 |
| 2008/0257570 A1* | 10/2008 | Keplinger ............ A01B 63/145 | 172/7 |
| 2009/0011777 A1 | 1/2009 | Grunebach et al. | |
| 2009/0160873 A1 | 6/2009 | Kew et al. | |
| 2009/0210277 A1 | 8/2009 | Hardin et al. | |
| 2009/0320461 A1 | 12/2009 | Morinaga et al. | |
| 2010/0065155 A1 | 3/2010 | Peltomae et al. | |
| 2010/0106344 A1* | 4/2010 | Edwards ............... A01G 23/006 | 701/2 |
| 2012/0084349 A1 | 4/2012 | Lee et al. | |
| 2012/0130632 A1 | 5/2012 | Bandyopadhyay et al. | |
| 2014/0214604 A1 | 7/2014 | Albrecht et al. | |

OTHER PUBLICATIONS

Brolly, Colin, "E-BUSINESS Case Study", "Theme: Benefits of Innovation and Investment in Harvesting technology", e_Business Forum, Scottish Forest Industries Cluster, Nov. 2005, 2 pages.

Courteau et al., "L'Amenagement Exact: Un Outil Our La Gestion Forestiere Integree", WSI 3452 (bi) ODC 387, Congress annuel 1998 F30-F39.

Deere & Company, "Timbermatic Control and measuring system", 2006, p. 1, 021-2, 021-7, 043-7.

FPInnovations Feric, Precision Forestry Tools to Maximize Wood Fibre Value, presentation slides, dated Apr. 3, 2008.

Harvest Tracking and Navigation with GPS by Michael E. Wolfe, Department of Geodesy and Geomatics, Engineering University of New Brunswick (Year: 1999) (Submitting 2 files).

International Search Report, Genesis Industries, LLC, PCT/US2010/040183, dated Jan. 9, 2010.

Johndeere, "TimberNavi", http://www.timberoffice.com/english/products/timbernavi/, printed Jun. 16, 2010, 1 page.

Johndeere, Timbermatic 300 700 900, Brochure, 16 pages. (Date unknown).

Johnson, "GIS and GPS Systems" Tech Update, Logging and Sawmilling Journal, Aug. 2000, from http://www.forestnet.com/archives/Aug_00/tech_update.htm.

Kryzanowski, "Linking the machine and the mill", High-Tech Harvesting, Logging and Sawmilling Journal, Oct. 2003, from http://www.forestnet.com/archives/Oct_03/hightech_harvesting.htm.

Lone Worker Monitoring by SafetyLine, http://web/archive.org/web/20080104091754/http:/www.loneworkermonitoring.com, 1 page, printed Jun. 17, 2010.

Lone Worker Safety Solutions, "Location Based Services (LBS)", 1 page, http://www.loneworkermonitoring.com/employee-vehicle-asset-tracking.htm printed Jun. 10, 2010.

Miller, Shannon et al., "Calculating Longitudinal Wheel Slip and Tire Parameters Using GPS Velocity" Proceedings of the American Control Conference, Jun. 25-27, 2001, pp. 1800-1805.

Owende, P.M.O., et al., "The Ecowood Project" "Operations Protocool for Eco-Efficient Wood Harvesting on Sensitive Sites", Dec. 2002, 70 pages.

Ponsse Annual Report 2001, 30 pages.

Ponsse Plc, Harvester control system, http://www.ponsse.com/english/products/Opti/forest_machines/harvesters.php, 2 pages printed Jun. 11, 2010.

Program for Spring Meeting of Canadian Woodlands Forum, dated Apr. 2, 2008.

Protest, The Commissioner of Patents, Canadian Intellectual Property Office, Genesis Industries, L.L.C., US, Canadian Patent Application 2,638,423 filed Jul. 30, 2008, letter dated Jun. 17, 2010, 21 pages.

Reynolds, "Use of GPS-based navigation to facilitate mixedwood selection cuts at night", Feric Advantage, vol. 1, No. 18, Jun. 2000.

(56) References Cited

OTHER PUBLICATIONS

Technology in the Forest, Eco-Link vol. 12, No. 2, Temperate Forest Foundation (Year: 2002).
Timberoffice, "TimberNavi", 2005, url: http://www.timberoffice.com/english/products/timbernavi/.

* cited by examiner

MANAGING LANDBASES AND MACHINE OPERATIONS PERFORMED THEREON

PRIORITY STATEMENT

This application is continuation of application Ser. No. 15/376,465 filed on Dec. 12, 2016 which is a continuation of application Ser. No. 14/152,635 filed on Jan. 10, 2014 which is a Continuation of application Ser. No. 12/118,417 filed on May 9, 2008, which applications are hereby incorporated by reference in their entirety.

FIELD OF THE INVENTION

The present invention relates to a method for management of land bases and machine operations performed thereon.

BACKGROUND OF THE INVENTION

The background of the invention is generally provided in the context of forest management. However, it is to be understood that forest management is merely one type of land management. Regarding forest management, historical land management practices have relied on data that contains an inherent amount of inaccuracy with regards to land boundaries, buffered areas, road utilization zones, and general forest area composition. The mechanisms for managing this inaccuracy and means for correcting it vary, and have included but not been limited to: United States Geological Survey maps, land ownership maps, traditional methods of surveying, collection of hand mapped OPS data, creation of boundary shape files utilizing remote sensing photographs and/or images. Remote sensing data utilized has included, but not been limited to: airborne and satellite based passive sensing utilizing electromagnetic wavelengths from the ultraviolet (UV—0.24 μm) through the far infrared (FIFR—1 mm) spectrum to create photographs and digital imagery as well as active sensors including, but not limited to airborne and satellite based RADAR (RAdio Detection And Ranging) and LIDAR (LIght Detection And Ranging).

Often land management data accuracy is corrected through remote sensing or hand mapping after practices such as a final timber harvest or thinning operations, which then show clearly the delineation lines such as boundaries, natural obstacles or out pieces, and environmentally sensitive areas. These practices, however serve as historical accounts of what has occurred, not what is occurring. This occurrence is in reference to management practices including, but not limited to timber harvesting and best management practices such as bulldozer work for remediation after harvest operations. These mechanisms for correcting the accuracy of land base data are often slow, costly and can be delayed by adverse weather conditions such as cloud cover in the case of remote sensing.

A major concern associated with delays in correcting management data, is subsequent operations that rely on this data and the potential economic and environmental impact of inaccurate information. With operations such as fertilization, competitive vegetation management, mechanical site preparation and planting, significant costs are incurred by the land owners or managing entities with each operation. For every acre of land that is improperly managed or accounted for, there is an associated cost. Sensitive areas such as streamside management zones (SMZ's) or protected wildlife areas may possess no potential economic return despite receiving additional inputs such as fertilizer or herbicide. Additionally, there may be negative environmental impacts such as surface water contamination with fertilizer or non-target injury of non-crop trees such as hardwoods in the SMZ.

Aside from the negative impacts associated with poor data in forest management activities, there exists the issue of improper asset valuation in timber stands derived from the classification of land as either productive "crop" areas or environmental management areas such as SMZ's. Additionally, certain areas within productive crop areas may have been damaged due to insect infestations, fires, or flooding, rendering them non-productive until the next crop rotation. Depending on the level and direction to which the information is skewed, this can dramatically impact investment firms, landowners, or individual investors in either a positive or negative direction with regards to the overall value of any particular owned quantity of land.

Furthermore, harvesting practices associated with timber production have suffered greatly in terms of production efficiency as a result of suppressed operator situational awareness in wooded settings. Due to the reduced sense of awareness an equipment operator may experience, with regards to his or her specific location within a defined parcel of property, a diminished level of equipment production efficiency as a result of the reoccurring act of identifying and verifying ones exact position or the direction in which to proceed with a prescribed activity. In other words, an operator may not be able to see the proverbial forest for the trees.

This level of confusion or inefficiency often results in, but is not limited to: the incomplete harvesting or maintenance of specified areas, inaccurate delineation of areas that are harvested, suboptimal layout and design of harvest or maintenance activities, incomplete harvest cycles with harvested timber not being retrieved for delivery to mills, inaccurate estimates of projected completion times, or improper allocation of logistics resources such as trucking.

Efforts to counteract the previously mentioned inefficiencies have included, but were not limited to the use of: printed paper maps comprised of remote sensing photogrammetry or imaging, existing shape files, digitized or hand drawn sketches placed in the possession of equipment operators, physical pre-operation site evaluations and orientations, utilization of colored paint or flagging for boundary identification, or point specific verbal and visual notifications conducted by the managing authority over specific properties. These solutions each contain a significant level of ineffectiveness due to errors in either information interpretation or the inability to transfer properly the actual physical location of an operator or equipment to the reference point on the associated support documents.

More specific to the logistics associated with product movement, estimates are made regarding the volume of product currently available for transport and then either turned into dispatch for transport resource allocation or a contract harvester utilizes one's own transport fleet. In terms of dispatch transportation the "estimation" often resulted in the inappropriate allocation of trucks for transporting the available product to processing centers which in turn results in increased transportation costs or decreased production at the harvest site with either too many or too few trucks being dispatched.

Therefore, it is a primary object, feature, or advantage to provide an on board operator interface with all available property parcel database information such that this is made available to equipment operators at the point and time of harvest.

It is a further object, feature, or advantage of the present invention to provide real-time visual referencing of equipment and operators in relation to specified boundaries and any known or previously recorded features of any specified parcel of property.

It is a further object, feature, or advantage of the present invention to provide real-time visual referencing and position of equipment and operators in relation to one another.

It is a still further object, feature, or advantage of the present invention to provide a real-time display for equipment operators of the relative location of all electronically tagged ground personnel working in close proximity to forest management equipment.

Yet another object, feature, or advantage of the present invention is to provide for real-time documentation and mapping of actual forest management events and activities.

A still further object, feature, or advantage of the present invention is to provide equipment operators with a GIS application.

Another object, feature, or advantage of the present invention is to provide yield monitoring based on extrapolation or direct sensing to develop forest productivity models which may be used in developing maps for variable rate applications with regards to fertilization or herbicide applications.

Yet another object, feature, or advantage of the present invention is to provide a real-time data log, which may be used for determining the "actual" operational efficiency of equipment with regards to the performance of the exact task for which said equipment was designed vs. actual total time of operation over any pre or post determined period of time.

A further object, feature, or advantage of the present invention is to provide for estimated volume calculation of raw goods available for transportation at a centralized loading point in field locations on any specified parcel of property resulting from the data generated by the combination of the various systems on individual machines in a harvesting operation.

A still further object, feature, or advantage of the present invention is to provide a real-time wireless or manual transfer of all available data between all operational aspects of land management which may include, but not be limited to, equipment operations, supervisory personnel, logistic activities, and central land management databases.

Another object, feature, or advantage of the present invention is to provide real-time tracking and evaluation of all equipment and individuals associated with any specified forest management operation providing the ability to view and manage any combination of activities from a remote location in an effort to optimize the efficiency, profitability, quality, and/or safety of specified activities.

Yet another object, feature, or advantage of the present invention is to provide reconciliation of paperwork associated with logistic processes such as transportation through the uses of all associated land base information which may include but not be limited to timber tract loading location(s), load numbers, mill destinations, time and date of origination, contractor information, landowner and manager information, and product type.

A further object, feature, or advantage of the present invention is to provide for product security through electronic tracking of transport equipment such as trucks with all associated product, land owner/manager, and contractor information tied to each specific load.

Yet another object, feature, or advantage of the present invention is to provide a simplified interface to a GIS application suitable for use when operating equipment which performs work operations on a land base.

One or more of these and/or other objects, features, or advantages of the present invention will become apparent from the description that follows. No single aspect or embodiment of the invention need exhibit every object, feature, or advantage set forth above.

BRIEF SUMMARY OF THE INVENTION

A method is provided for management of a land base; wherein, operations are performed on the land base by equipment operated by an operator. The method includes a computer running a Geographical Information System (GIS) application which senses an operational function or functions of the piece of forestry equipment. Upon sensing the function or functions performed by the piece of forestry equipment, the computer stores the operation as map points, lines, or polygons on at least one data layer within the GIS application, and displaying the GIS application to the operator at the location and time of performing the operations.

According to another aspect of the present invention, a system for management of a land base is provided. The system includes a self-propelled machine for performing land management operations on the land base, a computer operatively connected to the self-propelled machine, a GIS application executing on the computer, and a geoposition determining device in operative communication with the computer. There is at least one machine sensor operatively connected to the self-propelled machine and in operative communication with the computer for sensing the land management operations performed by the self-propelled machine on the land base. The GIS application is adapted to display a map and a plurality of layers of data on the map. At least one of the pluralities of data layers comprises data indicative of the land management operations performed by the self-propelled machine on the land base.

According to another aspect of the present invention, a method for management of a land base wherein work operations are performed on the land base by a machine operated by an operator is provided. The method includes interfacing the machine to a computer using a bus module electrically connected between the machine and the computer, and placing a geographical information system (GIS) application on the computer such that the computer is configured to monitor the operations and store data about the operations as map points, lines, or polygons on at least one data layer within the GIS application. The method further includes displaying the GIS application to the operator on a touch screen display at the location and time of performing the operation. The GIS application includes a plurality of data layers, including at least one data layer comprising data for work operations performed by at least one additional machine.

DETAILED DESCRIPTION OF THE PREFERRED EMBODIMENT

I. Overview

The present invention applies a new approach to the activities associated with land management. The present invention relates to recording, documenting, processing, correcting, managing, and sharing all information regarding any management activities that deal with the direct interaction of equipment and people with land, natural resources, or recreational areas. The present invention may be used as a part of a complete system to collectively interact with and aid in managing all aspects and operations simultaneously. Alternatively, different aspects of the invention may be used separately. The present invention may provide advantages relating to enhancing individual equipment productivity, increasing operator safety, increasing operational efficiency, increasing security, or increasing overall quality of operations regarding land stewardship.

One aspect of the present invention allows for the data collection to be performed at the location and time of need, such as by equipment used in forest harvesting or other land management activities. Instead of merely collecting data, and later reconciling with other information, or later communicating to a home office, once collected, the data can be displayed and used to promote efficiencies in forest harvesting or other land management processes.

Figure 1:
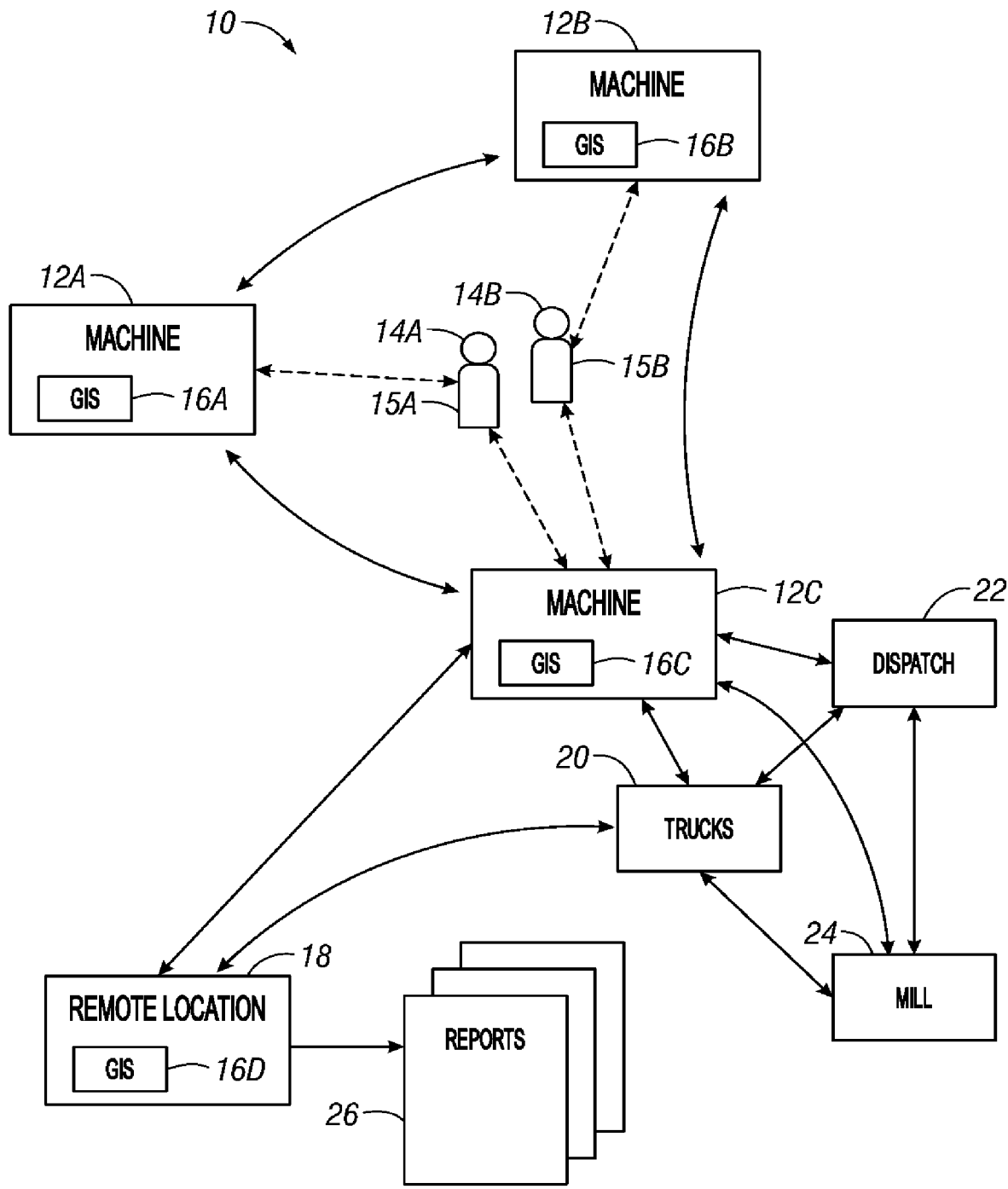
FIG. 1 is a block diagram of one embodiment of a system of the present invention.

FIG. 1 provides an overview of one embodiment of the present invention. In FIG. 1, a system 10 is shown. The system 10 shown includes a first machine 12A, a second machine 12B, and a third machine 12C. Of course any number of machines may be used. Each machine 10 is configured for operating a GIS application 16A, 16B, 16C. In addition, a remote location 18 is shown. The remote location 18 may be a home office, but need not be. The remote location 18 also has an associated GIS application 16D. The machines 12A, 12B, 12C operate on a land base performing work operations. In addition to the machines 12A, 12B, 12C, there are workers 14A, 14B on the land base. Although two workers are shown, of course there may be additional workers present. Real-time communications occur between the machines 12A, 12B, 12C and equipment 15A, 15B associated with the workers which may include RFID tags, beacons, transmitters, or transceivers with or without GPS enablement for tracking positions of the workers. In addition, the equipment 15A, 15B may include handheld terminals. In this way, the location of the workers can be identified and communicated to the machines 12A, 12B, 12C. In addition, each machine 12A, 12B, 12C communicates information between itself and other machines. The information transmitted preferably includes data points regarding each machine's performance and/or location of work operations, or other information that may be saved or stored in a layer of the GIS applications 16A, 16B, 16C, 16D. In addition, each machine 12A, 12B, 12C may save this information locally.

A dispatch station 22 may be in operative communication with one or more of the machines 12A, 12B, 12C. The dispatch station may dispatch trucks 20 or other vehicles to pick up loads of timber for delivery to a mill 24. The present invention allows for real-time reporting. For example, an estimated volume may be calculated for raw goods available for transportation at a centralized loading point in field locations on any specified parcel of property resulting from the data. This information may be communicated to or calculated by the dispatch station 22, the trucks 20, or the mill 24.

The remote location 18 may use data associated with its GIS application 16D to generate reports associated with different tracts of lands, job sites, or field operations. Of course, reporting may also take place using the GIS applications 16A, 16B, 16C associated with machines 12A, 12B, 12C. The reporting may include detailed processing and analysis performed during or after operations associated with a particular land base.

II. Machine Operation

Figure 2:
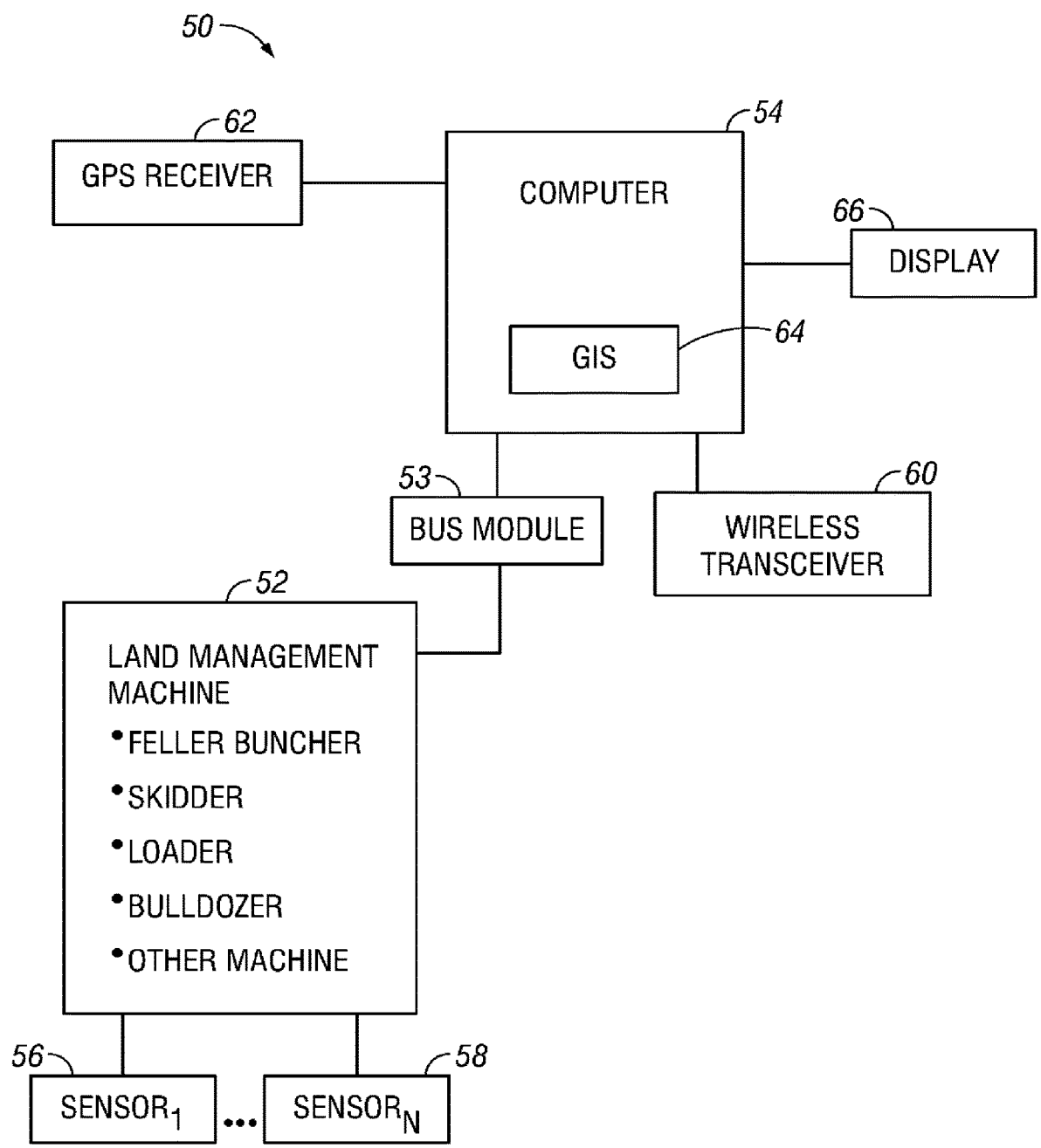
FIG. 2 is a block diagram of a machine configured for use with a GIS software application.

FIG. 2 illustrates a system 50. The system 50 includes a land management machine 52 such as, but not limited to, self-propelled machines used in timber harvesting such as feller bunchers, skidders, loaders, as well as machines such as bulldozers used to perform land management operations. A computer 54 is operatively connected to the machine 52. One method of connecting the computer 54 is to use a bus module 53 to transform electrical impulses associated with operational functions into signals capable of being accepted by the computer 54. The computer has an associated display 66. There is a geographic information system (GIS) software application 64 executing on the computer 54. The GIS software application 64 may be based on an ArcGIS software application or any other type of commercially available GIS application. One or more sensors 56, 58 are also operatively connected to the machine 52 and are in operative communication with the computer 54. The sensors 56, 58 may be of various types for various purposes, the type and purpose may be determined by the particular type and function of the machine 52. For example, where the machine 52 is a feller buncher, the sensor may be a sensor that senses closing of the arms which is associated with cutting of a tree. Similarly, where the machine 52 is a skidder, the sensor 56 or the sensor 58 may be a sensor that senses that a load of trees has been picked and/or released. Any number of sensors may be present. The sensor or sensors may also be functioning to determine the distance of the harvesting head from the GPS antenna in the case of tracked feller bunchers which utilize extendable arms or booms. The system 10 may also include a geolocation sensor such as a GPS receiver 62 which is operatively connected to the computer 54 or the machine 52. The GPS receiver 62 provides a location signal which can be used to associate a time and location with data from the machine sensors 56, 58.

A wireless transceiver 60 is operatively connected to the computer 54. The wireless transceiver 60 allows data to be exchanged between the machine, one or more additional machines, and/or said machines with additional personnel appropriately equipped with personal computer and or other personal wireless data collection devices. The wireless transceiver 60 may be of any number of types, such as, but not limited to a radio transceiver, a cellular transceiver, a satellite transceiver, or other type of transceiver.

The machine 50 allows for performing land management and related activities in a manner in which data associated with the land management activities may be collected, including time and location data determined using the GPS receiver 62, and data from the machine sensors 56, 58. There may be any number of sensors or any number of types of sensors. This data collected may then be placed within one or more layers of data associated with the GIS application 64. Maps with the one or more layers of data may be shown on the display 66 to assist an operator of the machine 52. The display 66 is preferably a touch screen display. In addition, the data may be stored locally or communicated over the wireless transceiver 60 to one or more other machines or to other remote locations. Although a wireless transceiver 60 is shown, the present invention contemplates that in some applications data may be stored on removable media, such as USB drives and transferred from one machine to another machine.

As shown in the system of FIG. 2, an on board operator and equipment interface provides all available property parcel GIS database information to the operator while the operator is performing work operations on the land base. The GIS application which is a part of this interface allows for real-time visual referencing of equipment and operators in relation to specified boundaries and any known or previously recorded features of any specified parcel of property. The display on the operating equipment monitor allows for displaying the relative location of electronically tagged ground personnel working in close proximity to forest management equipment.

An operator of the machine thus has access to real-time documentation and mapping of actual land management events and activities. The GIS application allows for fully interactive operator use of any predefined and or modified functions associated with the GIS application. Examples of such functions include, without limitation, on screen creation of polygons for area determination, distance measurement tools, remote sensing imagery overlays, polygon I shape file incorporation which may encompass any or all know information or features of any designated parcel of property, general topographical map overlays, guidance tools for standardizing travel path directions and spacing. The GIS application also allows for machine or equipment operation or activity mapping points, lines, or polygons with the associated time and date. Examples of such activities may include, without limitation: harvested trees; laid down bundles of trees; trees per bundle laid down; retrieved bundles of trees with associated tree count; loaded forestry products; delivered forest products; creek (SMZ) crossing locations; road system construction and utilization; use frequency in equipment traffic zones; snow grooming areas and activities; fire line construction and maintenance; gas pipeline or utility construction areas; mapping of discovered invasive or exotic plant areas; mapping of discovered endangered plant and animal species; extrapolated areas of excessive wheel slip, rutting or other environmental disturbances; corrective best management practices (BMP's); construction of water bars; road or log set maintenance; and SMZ crossing maintenance activities.

Data regarding any number of activities associated with equipment interaction may be collected. This may include general activities involving equipment interaction with land and natural resources as well as the associated covering such as snow and natural or unnatural debris. In addition, information such as yield monitoring based on extrapolation or direct sensing to develop forest productivity models which may be used in developing maps for variable rate applications with regards to fertilization or herbicide applications. In addition, a real-time data log may be used for determining the operating efficiency of equipment with regards to the performance of the exact task for which said equipment was designed vs. actual total time of operation over any pre- or post-determined period of time. Specific and general examples may include but are not limited to: tree harvester time spent harvesting vs. total time operating; tree retrieval equipment time spent retrieving vs. total time operating; and specific task operation of equipment vs. total operating time of equipment.

As shown in FIG. 2, real-time wireless transfer of all available data may be made between all operational aspects of land management which may include, but not be limited to, equipment operations, supervisory personnel, transportation of goods, and central land management databases. Alternatively, data may be loaded onto a USB drive or other type of removable storage and transferred. In addition, where a wireless transceiver is associated with each machine, the present invention allows for real-time tracking and evaluation of all equipment and individuals associated with any specified forest management operation providing the ability to view and manage any combination of activities from a remote location in an effort to optimize the efficiency, productivity, profitability, quality, and safety.

The present invention also provides for reconciliation of paperwork associated with logistical processes such as trucking through the uses of all associated land information which may include but not be limited to product origination location, load numbers, mill destinations, time and date of origination, contractor information, landowner and manager information, and product type. The present invention further provides for product security through electronic tracking of transportation equipment such as trucks with all associated product, land owner/manager, and contractor information tied to each specific load.

The present invention uses a software application which provides a new approach to acquiring and implementing the data associated with forest management practices. The software application provides a direct interface between the operating systems associated with forest management equipment, a OPS system, and a computing system capable of incorporating, displaying and allowing equipment operator interaction with all available electronically stored information associated with any specified parcel of property.

Furthermore, the programs that the computing system incorporates include, but are not limited to, Windows XP operating systems and software which interacts and operates in conjunction with all aspects of a GIS application such as ArcGIS or other commercial GIS applications. The present invention further contemplates that the system for miming the GIS application may be used for other purposes, such as controlling the machine.

The combination of software and hardware allows for the "real-time" collection of data regarding the operational events of forest management equipment that can and do impact the composition of the data being utilized for management decisions on any specified parcel of property as well as the logistical decisions made in managing the raw products obtained from this same stated parcel. Additionally, this "real-time" data management system records and documents discovered discrepancies that can and do exist within a landowner or managing entities known database of a specified parcel of property. The "real-time" transfer of data may also aid in logistics management with regards to the dispatch and tracking of transport services when used in conjunction with all other aspects of the present invention. It should be noted that the term "real-time" as used herein means real-time or near real-time such that data can be collected, and/or displayed at the location and time of use of equipment which performs operations on or associated with a land base.

The invention may be used as a fully integrated system or a standalone system, which may or may not be interfaced with any land management and or natural resource database being utilized to record, document, and store any event or activity that has or will transpire with regards to any specified parcel or collective parcels of land, along with their associated natural resources. The recorded and stored information may be used to correct or confirm the overall composition of any specified parcel or collective parcels of land. This composition refers to, but is not limited to the, natural or unnaturally defined boundaries, assets, natural resources, and or buffers of the stated parcel or parcels. Furthermore, the recorded data may be utilized in subsequent maintenance and or silvicultural activities to enhance economic returns by optimizing the utilization of any inputs while at the same time minimizing negative environmental and natural resource impacts and/or maximizing positive environmental and natural resource impacts.

Additionally, the information derived from the recorded activities may be used to analyze any and all activities associated with the interaction of equipment and personnel with a single or collective parcel of land, which may be singularly or collectively owned by one or more entities to include but not be limited to: investment groups, government agencies, sole proprietorships, or corporate entities. The analyzed information may be used to create a complete analysis of either the total operational efficiency of a land management system or any single aspect of this said system.

The interpretation of this information may be used to enhance the overall or singular operational productivity, efficiency, profitability and quality of the previously stated system through an interactive database which is programmed to allow the user defined extraction of information for management decisions whether economical or environmentally based. This database may be, but is not limited to, a web based system which receives the collected data from all interactive operations and then stores the proprietary data in a database system on a server or some type of interactive computer system. This database may be accessed by each respective entity for implementation into their system. This database system may be essential or nonessential to the utilization and implementation of each specific unit of equipment incorporating data collecting and mapping hardware and software. The data collecting and display hardware and software incorporated into the equipment systems may serve as a collective or stand alone systems serving solely as navigational aids improving operational and logistical efficiencies, while reducing negative or improving positive economic, environmental or natural resource impacts.

The above stated system functions as a result of the incorporation of computing systems into all mechanized activities that may occur on a specified parcel of land. This interaction of computers and machines is accomplished through bus modules which translate the direct current (DC) voltage associated with a particular function or operation into a digital signal which the computer is able to accept and a specified GPS coordinate possessing four dimensional data consisting of time, latitude, longitude, and elevation for use in land and resource management. Furthermore, equipment operators may create and utilize nonstandard information fields for further documentation of activities as well as observations that may be of value in a land management database.

III. Timber Harvesting Operations

Figure 3:
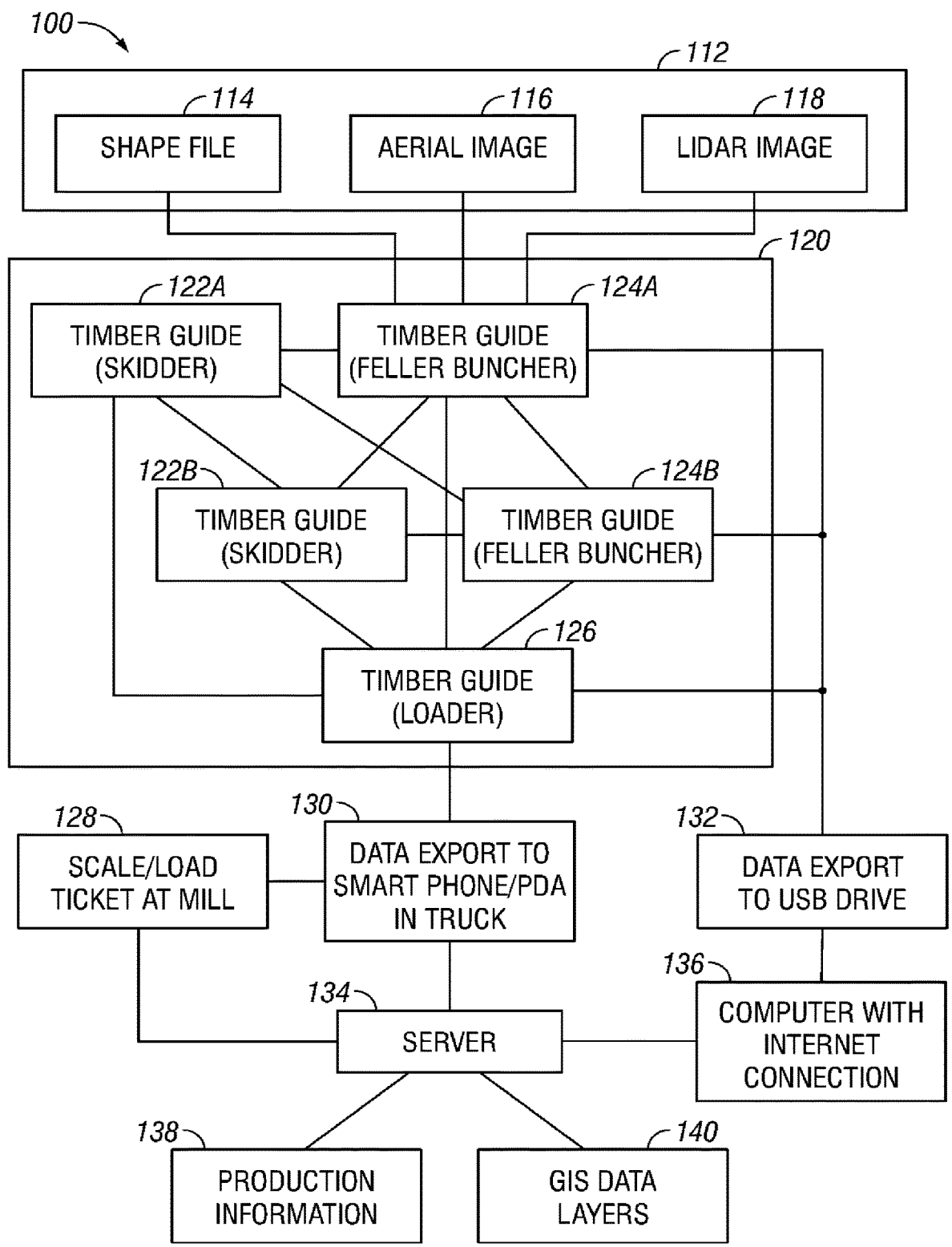
FIG. 3 represents the field communication network (example of a harvest system utilizing multiple harvesters and skidders.

To provide a further example of the present invention, the present invention is described with respect to an embodiment which may be used for timber harvesting. FIG. 3 is a block diagram illustrating in more detail information flow associated with timber harvesting operations. As shown in FIG. 3, there is a field communication network 100. Main components of the field communication network 100 include a GIS/remote sensing imagery module 112, a Timber Guide module 120, a Data Export to Smart Phone/PDA module 130, a Mill module 128, a Server module 134, and a Computer module 136. The GIS/remote sensing imagery module 112 includes a shape file 114 which may be used to define boundaries of a tract of land or other land base, remote sensing imagery which may include an aerial file 116 which includes an aerial image of the land base and a LIDAR image file 118 which includes a topographical representation of the land base. Instead of a LIDAR image file, other topographical data may be used. The module 120 includes Skidders 122a and 122b which is any type of heavy vehicle used in a logging operation for retrieving cut trees out of a forest in a process called "skidding" Feller Bunchers 124a and 124b are logging machines with an attachment that harvests trees in place, and a Loader 126 is a piece of equipment utilizing an extendable boom similar to an excavator with a set of rotating tongs, or grapple, at the end to handle logs. The Data Export to Smart Phone/PDA/personal computer/personal data collection device module 130 includes, but is not limited to, tract data layers, load tickets, scale tickets and notes of interest. The Mill module 128 function is associated with a mill that processes timber. The Server module 134 includes Production Information 138 and GIS Data Layers 140.

The various machines all utilize various data layers and information based on their function. Skidders 122a and 122b collect and maintain the data layers and information such as: on-site information center, shape file, remote sensing imagery such as aerial images, LIDAR/topographical information, bundles picked up, stream management zones (SMZ's) crossed and/or cleaned out, path's traveled, wheel slippage, travel speed and road mapping. Feller Bunchers 124a and 124b collect and maintain data layers and information such as tract shape file, remote sensing imagery, LIDAR/topographical information, A-B corridor guidance lines, trees harvested (production data derived from this layer), timber bundles laid down, road mapping, tonnage yield monitoring, 3D topographical display, and machine location recorded data. The machine location recorded data may include 4D GPS coordinates time/latitude/longitude/elevation, environmental impact monitoring, notes which include, but not limited to, the following: log sets, SMZ crossings and other points-of-interest (POI's) which include the following: endagered species, invasive species and hazards. A Loader 126 collects and maintains the following data layers and information: on-site information center, shape file, remote sensing imagery, aerial images, LIDAR/topographical information, bundles laid down, bundles picked up, equipment location, wheel slippage monitoring, tract/loader log database and wireless data export to smart phone/PDA/personal computer, personal data collection device. The Production Information module 138 may have three main components, statistics, image of harvested area and various data layers.

The Statistics data may include, but is not limited to, production time, trees harvested during hour (production), trees harvested per hour (productivity), acres harvested. The image of harvested acres data includes GIS and remote sensing information. The various data layers data may include, without being limited to, harvested trees, timber bundles laid down, bundles picked up, notes and Sustainable Forestry Initiative (SFI) data. GIS Data Layers 140 may include main components, guidance paths, shape file of tract, trees harvested, timber bundles laid down, timber bundles picked up, road mapping, wheel slippage monitoring and notes. Notes includes log sets, SMZ crossing and other points-of-interest. Other points-of-interest includes endangered species, invasive species, hazards and unharvestable areas.

Figure 4:
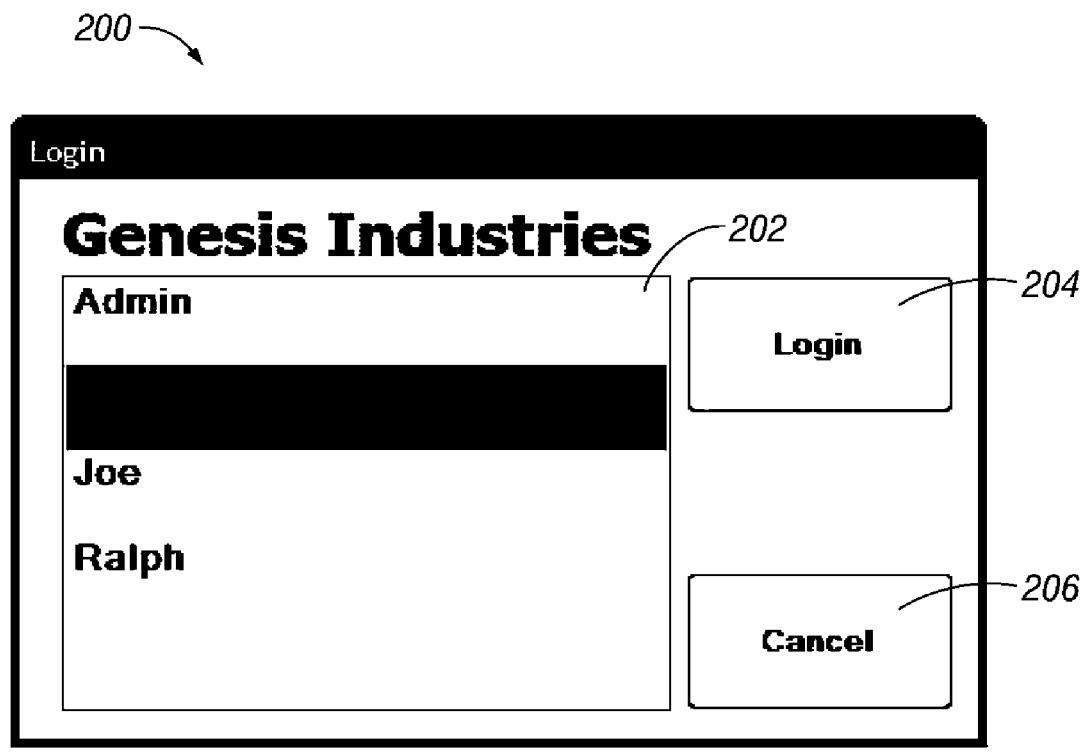
FIG. 4 is a screen display showing a login window.

As shown in FIG. 4, the login page 200, has three components, the Admin/Operator box 202 a Login button 204 and a Cancel button 206. Choosing Admin from the Admin/Operator box 202 allows a system administrator to add/change users (operators) or change/check system settings. The administrator area requires a password. This is to prevent any inadvertent changing of critical system settings. The system configuration comes preset from the factory. Choosing Operator Name from the Admin/Operator box 202 allows the operator to select his name by tapping name on screen and then taps the Login button 204. An operator's login can be password protected if so desired. Pressing the Login button 204 will advance to Job List screen 230. Choosing the Cancel button 206 closes the Login page and goes to the main screen 240.

Figure 5A:
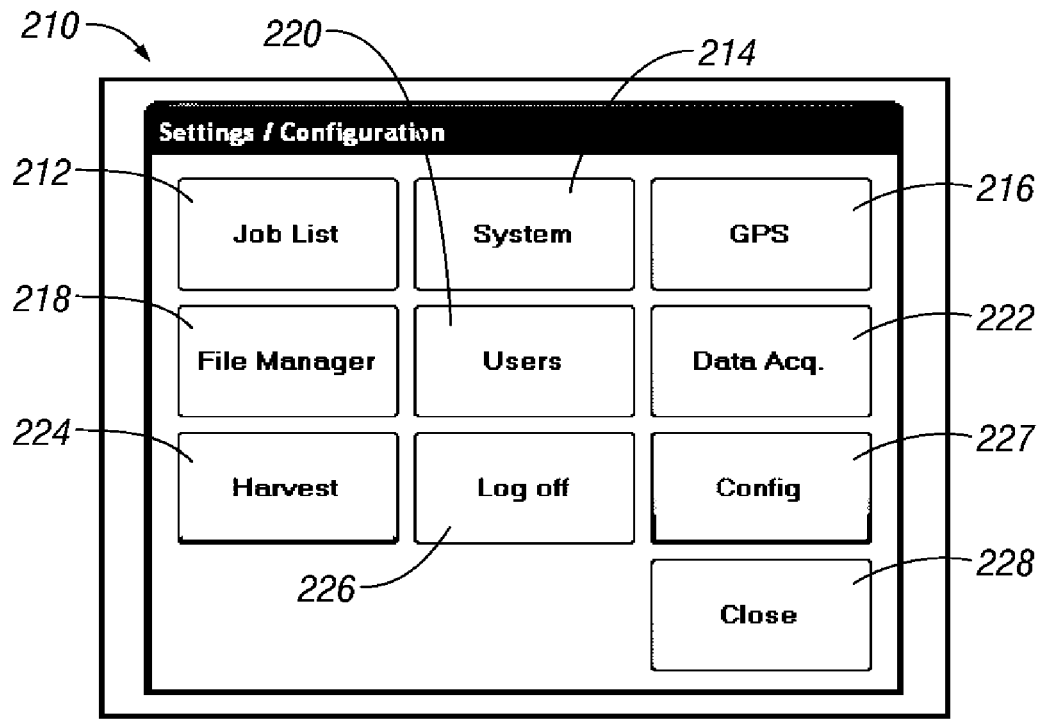
FIG. 5A is a screen display of an operator setting window.
Figure 5B:
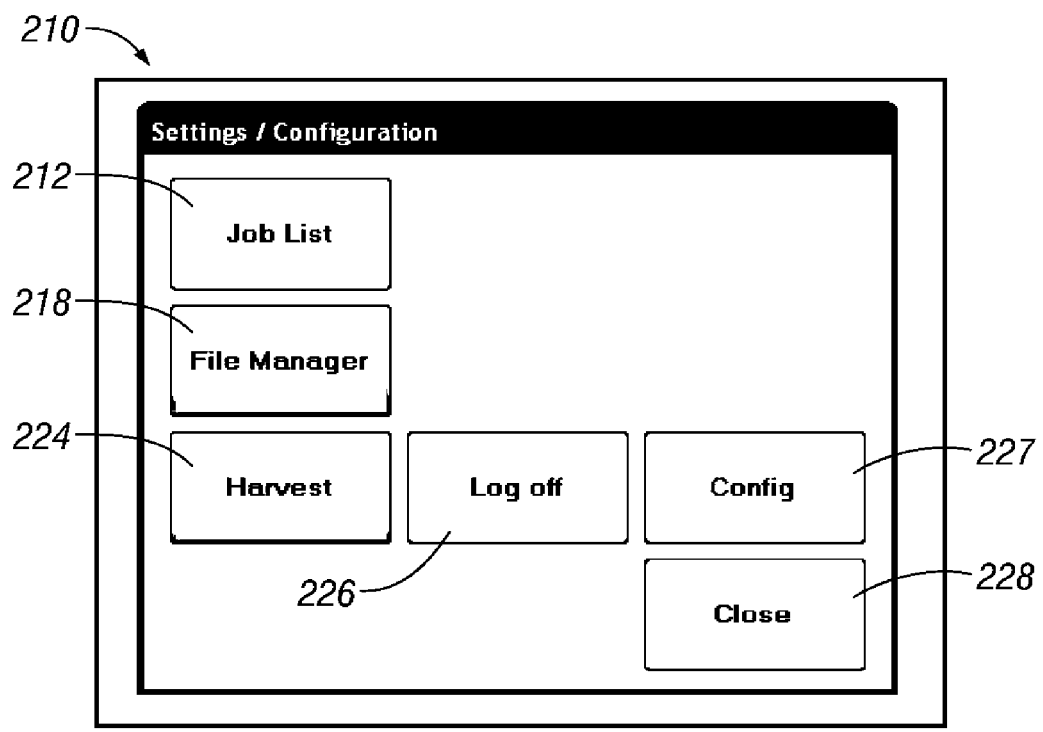
FIG. 5B is a screen display of a configuration window.

As shown in FIG. 5A and FIG. 5B, the Settings and Configuration page 210 allows the operator to choose between the Job List screen 230 (FIG. 6) by pressing the Job List button 212, the System screen by pressing the System button 214, the OPS Status screen 370 (FIG. 11) by pressing the OPS button 216, the File Manager screen 500 (FIG. 5A) by pressing the File Manager button 218, the Users screen by pressing the Users button 220, the Data Acq. Screen by pressing the Data Acq. Button 222, the Harvest Screen 320 by pressing the Harvest Screen button 224, the Logoff function which allows the operator at the end of the day/shift to clock out by pressing the Logoff button 226, the Config screen by pressing the Config button 227, and the Harvest Screen 320 by pressing the Close button 228.

Figure 6:
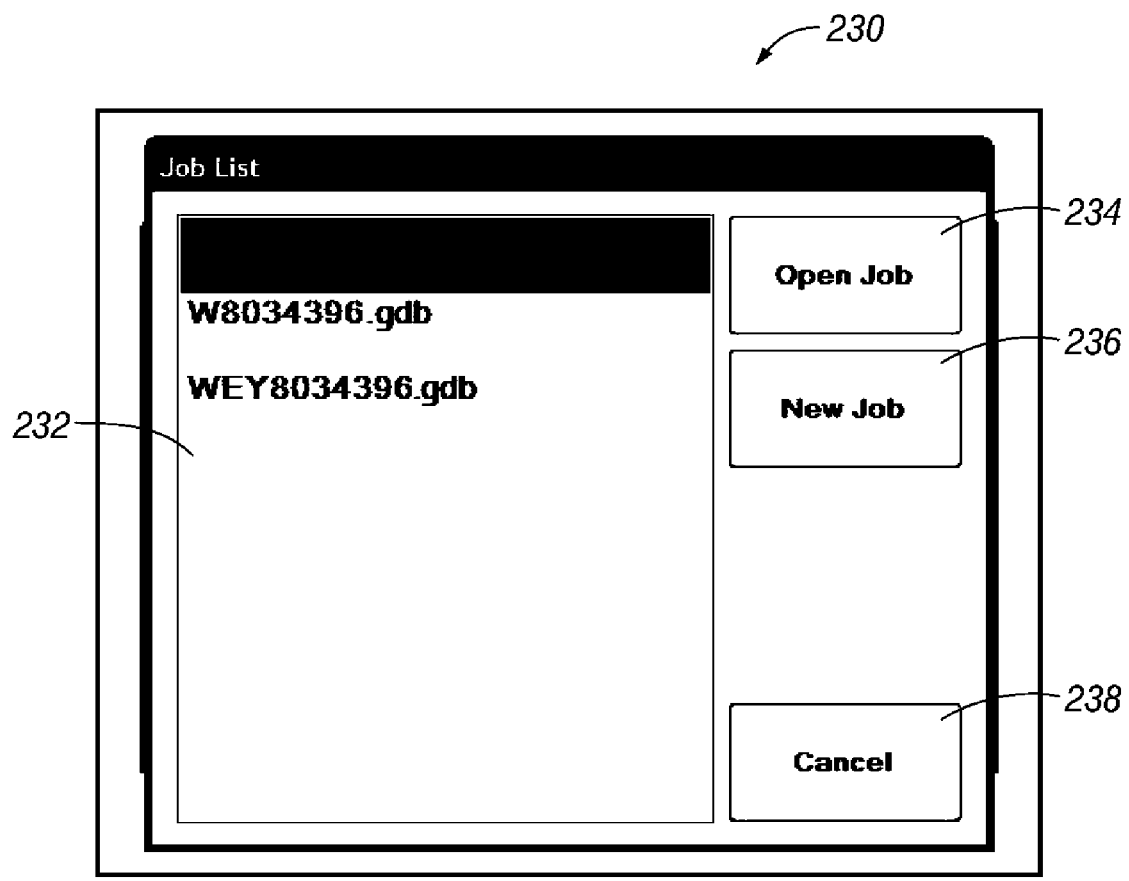
FIG. 6 is a screen display showing a job list window.

As shown in FIG. 6, the Job List screen 230 which is selected by pressing the Job List button 212 from the Settings/Configuration screen 210 has four components, the Job List box 232, an Open Job button 234, a New Job button 236 and a Cancel button 238. Select the tract name or number from the Job List box 232 and press the Open Job button 234 to continue work on a previously created job. Press the New Job button 236 to begin a new job. When assigning a new name for a tract it must begin with a letter. After creating a new file, the operator may then import shape, aerial, and/or LIDAR files from the Importing Shape File screen 501, the Importing Aerial Photos screen 502, and the Importing LIDAR Images 503. Press the Cancel button 238 to return to the main screen 240.

Figure 7A:
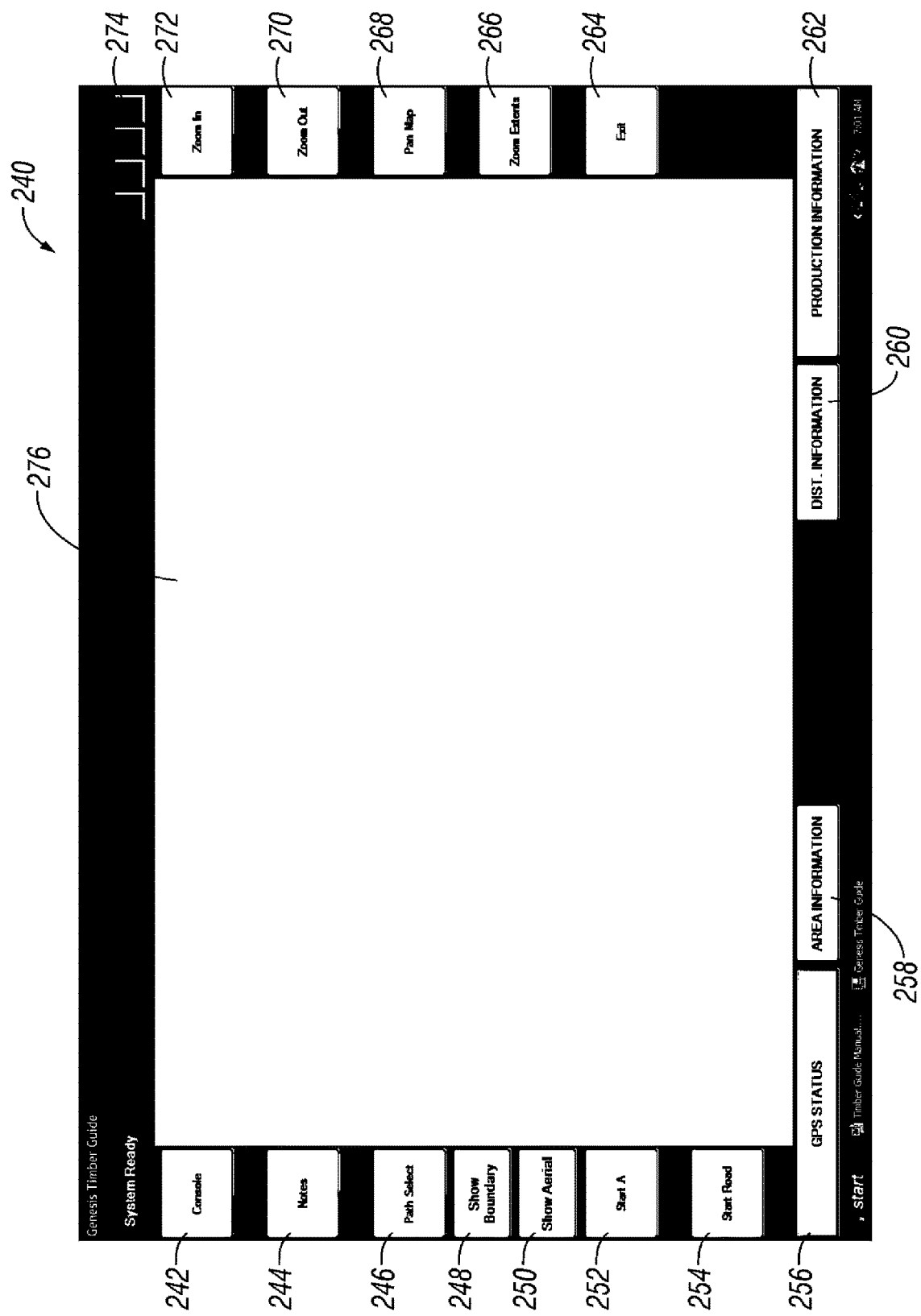
FIG. 7A-G illustrates a main screen display for a GIS application.

As shown in FIG. 7A, the main screen 240 has eighteen components, the Harvest screen 276, the Console button 242, the Notes button 244, the Path Select button 246, the Show Boundary button 248, the Show Aerial button 250, the Start A button 252, the Start Road button 254, the OPS STATUS button 256, the AREA INFORMATION button 258, the DIST. INFORMATION button 260, the PRODUCT INFORMATION button 262, the Exit button 264, the Zoom Extents button 266, the Pan Map button 268, the Zoom Out button 270, the Zoom In button 272, and the STATUS INDICATORS 274. Options and controls are selected by simply touching the desired button on the screen.

Figure 7B:
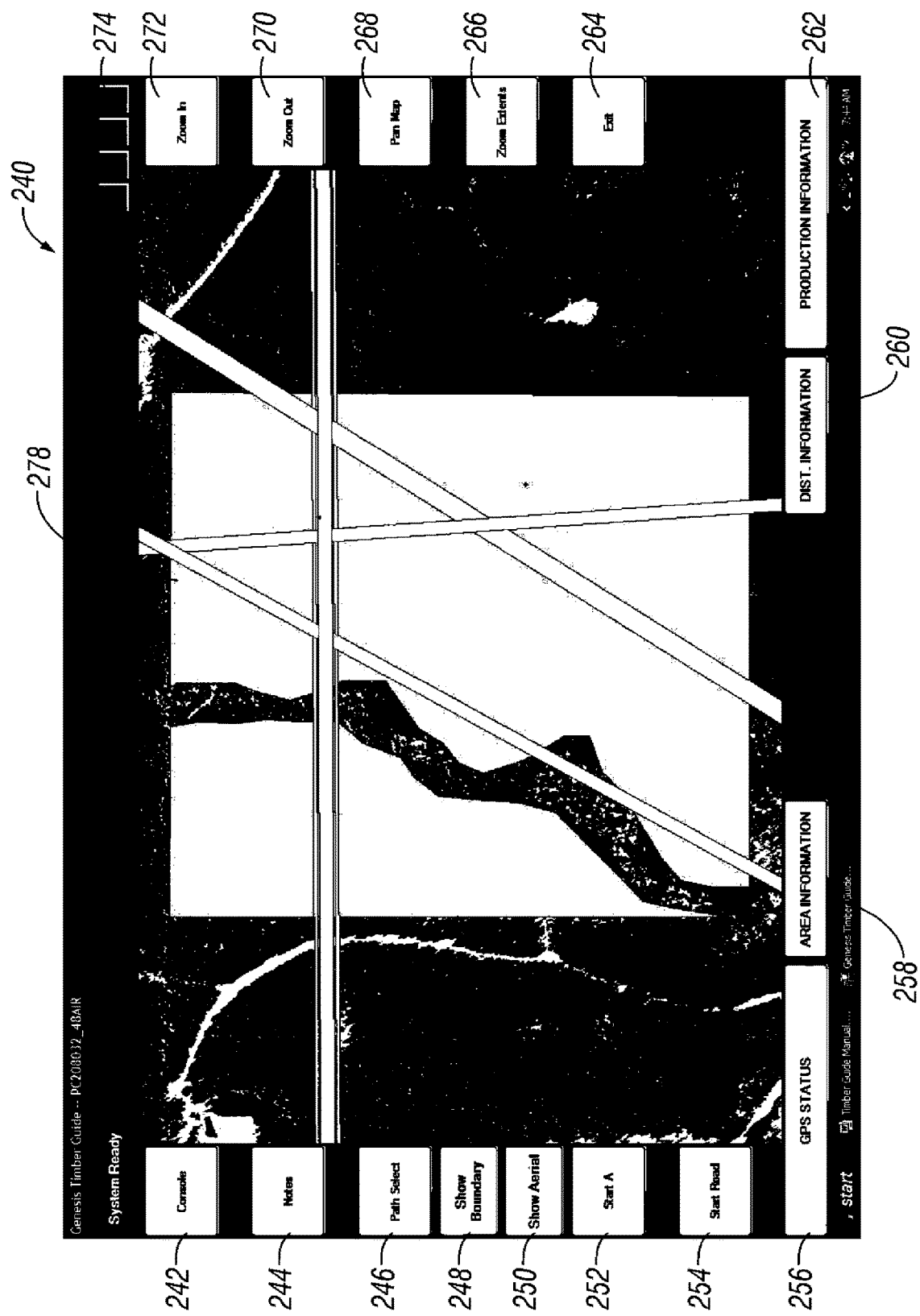

As shown in FIG. 7B, the Harvest screen shot 278 shows three previous path directions with current harvest path.

Figure 7C:
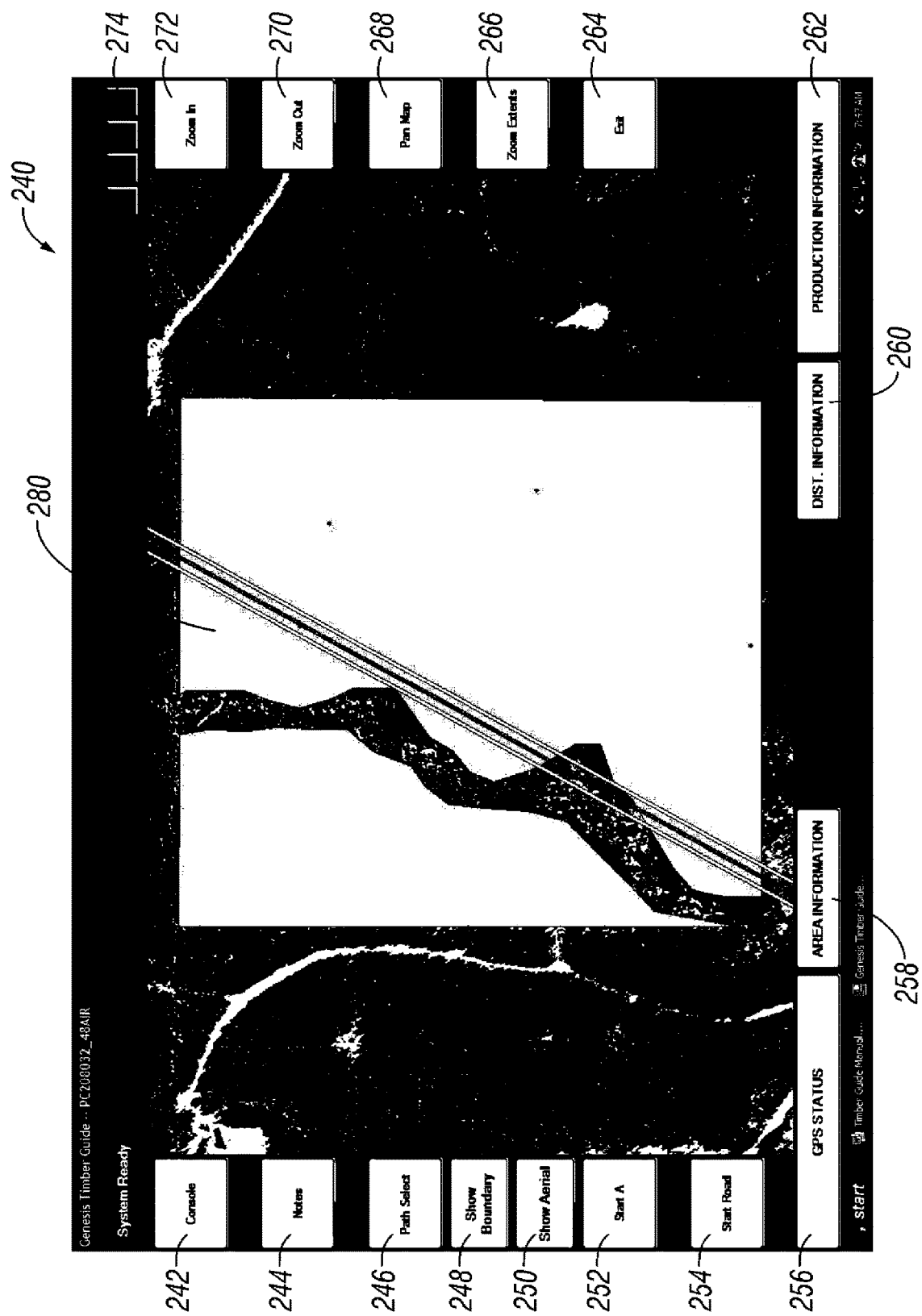
Figure 7D:
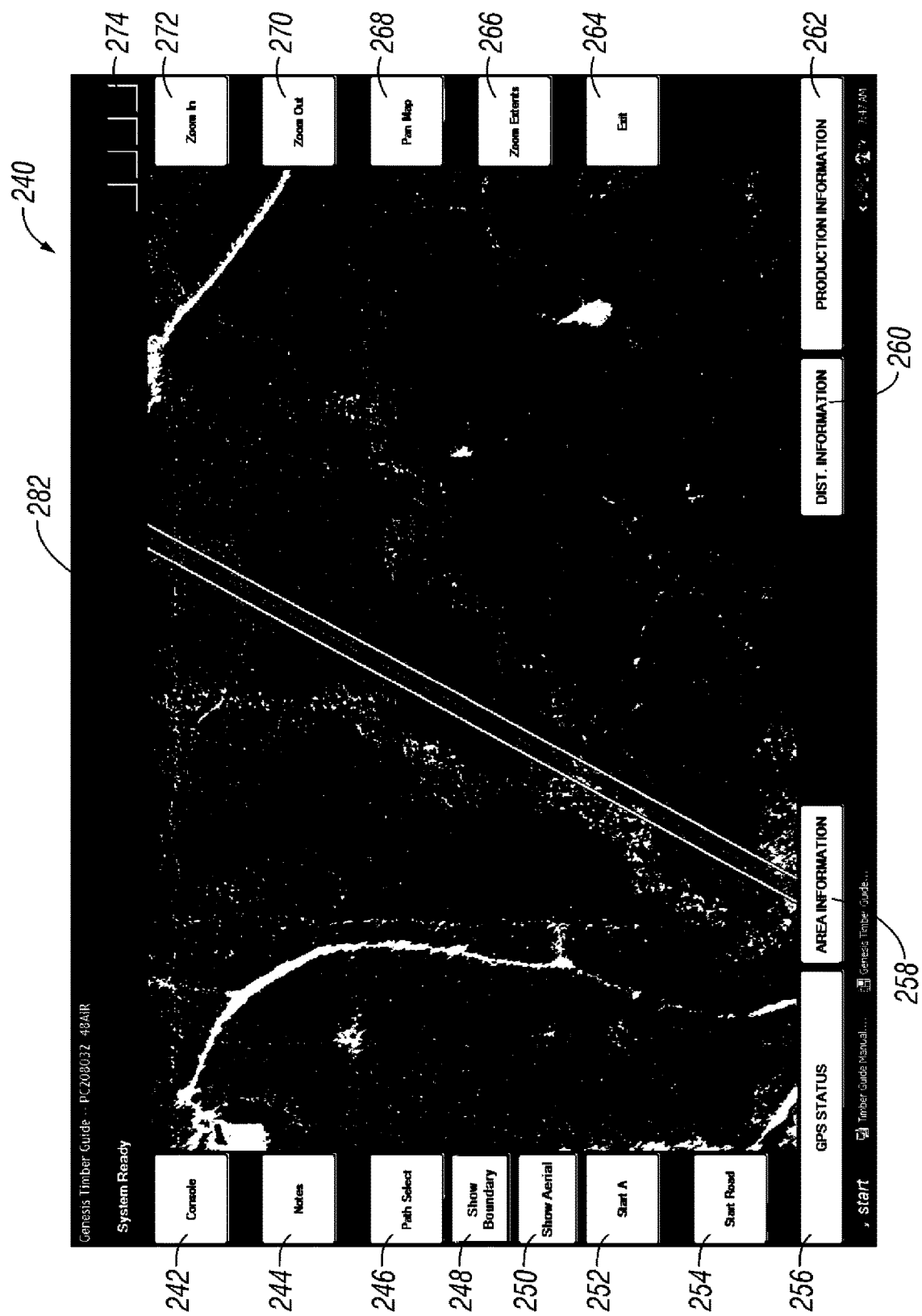
Figure 7E:
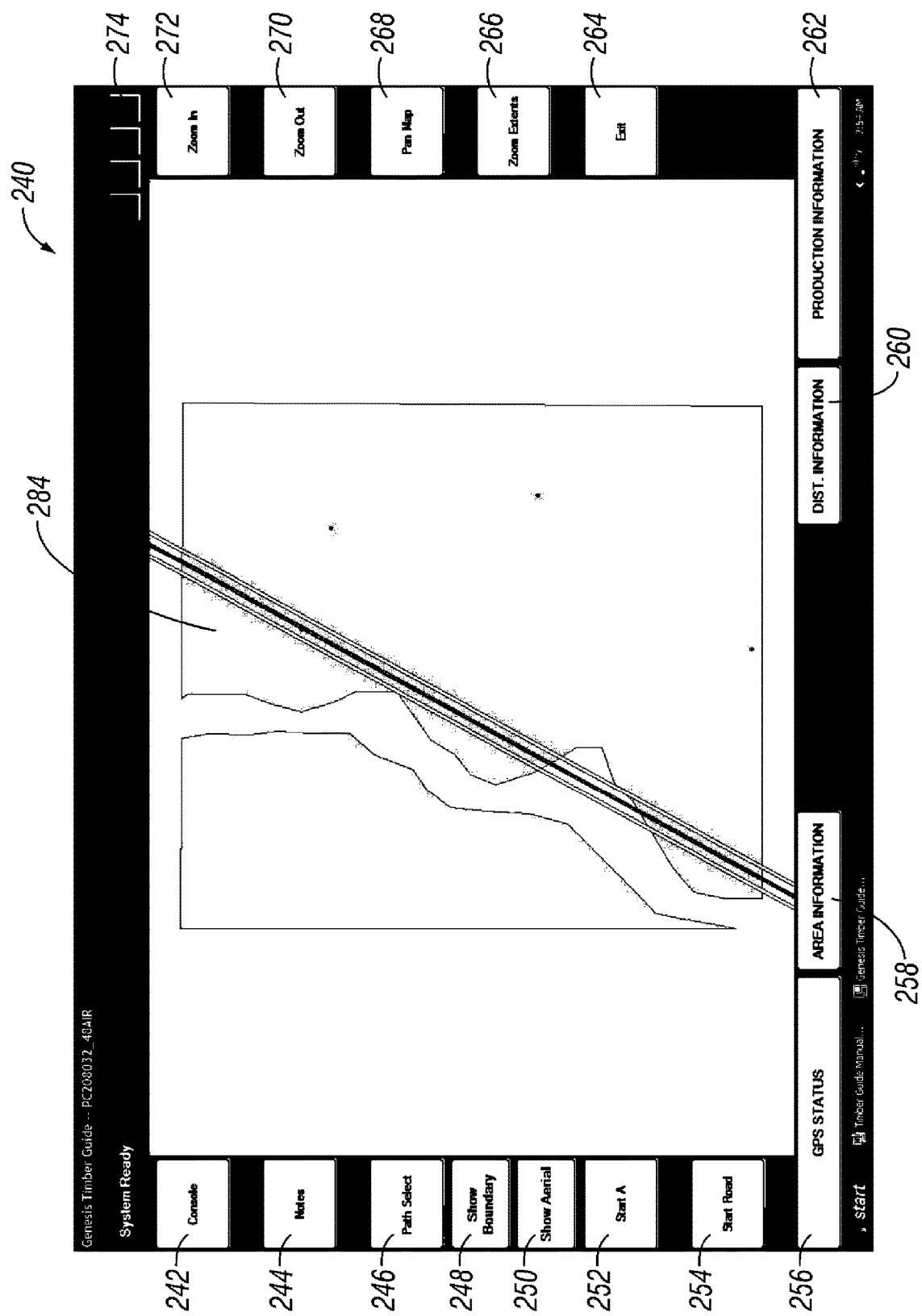

As shown in FIG. 7E, the Harvest screen shot 284 shows tract with tract shape file toggled on and aerial photograph toggled off.

Figure 7F:
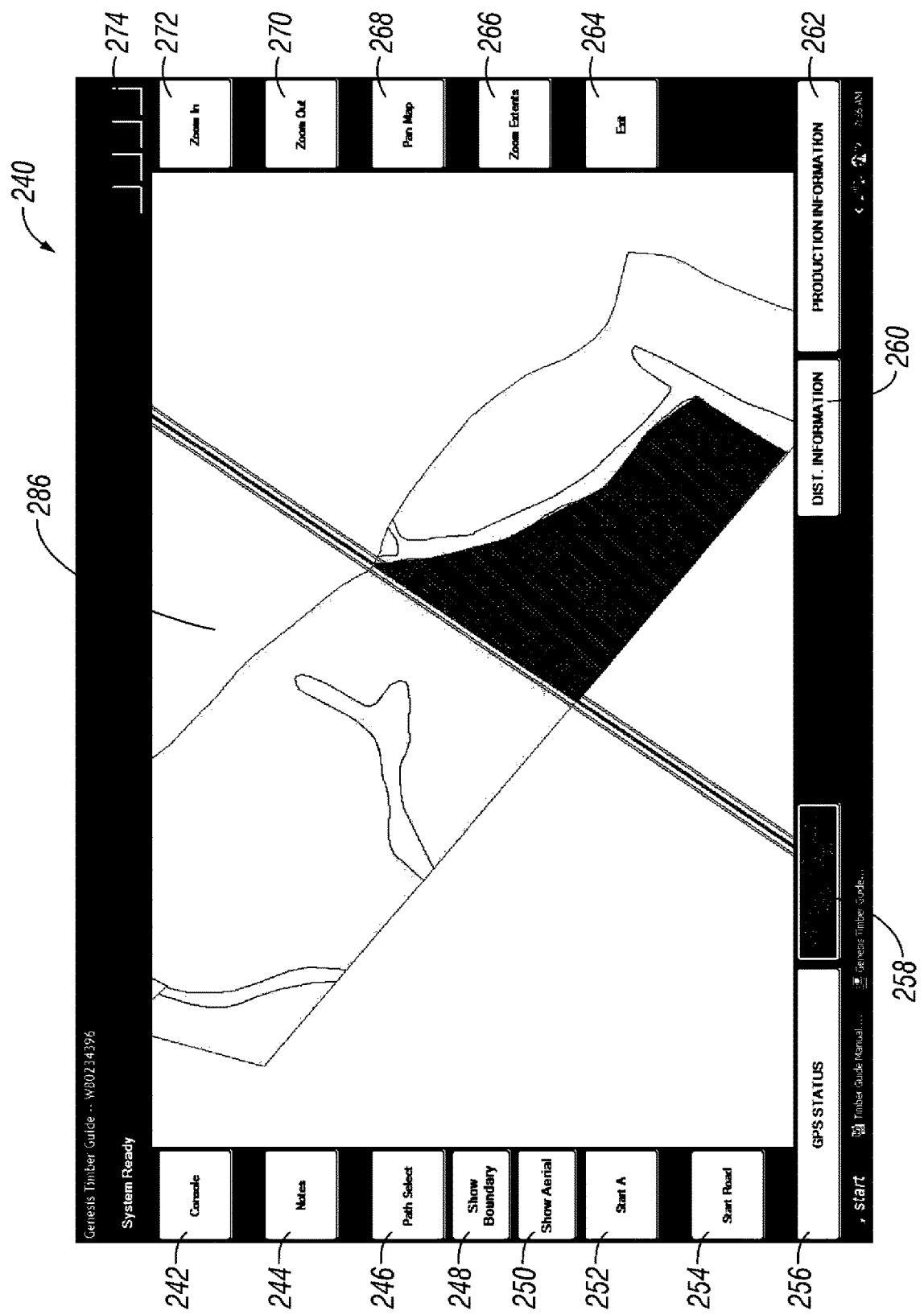

As shown in FIG. 7F, the Harvest screen shot 286 shows the area highlighted to determine area.

Figure 7G:
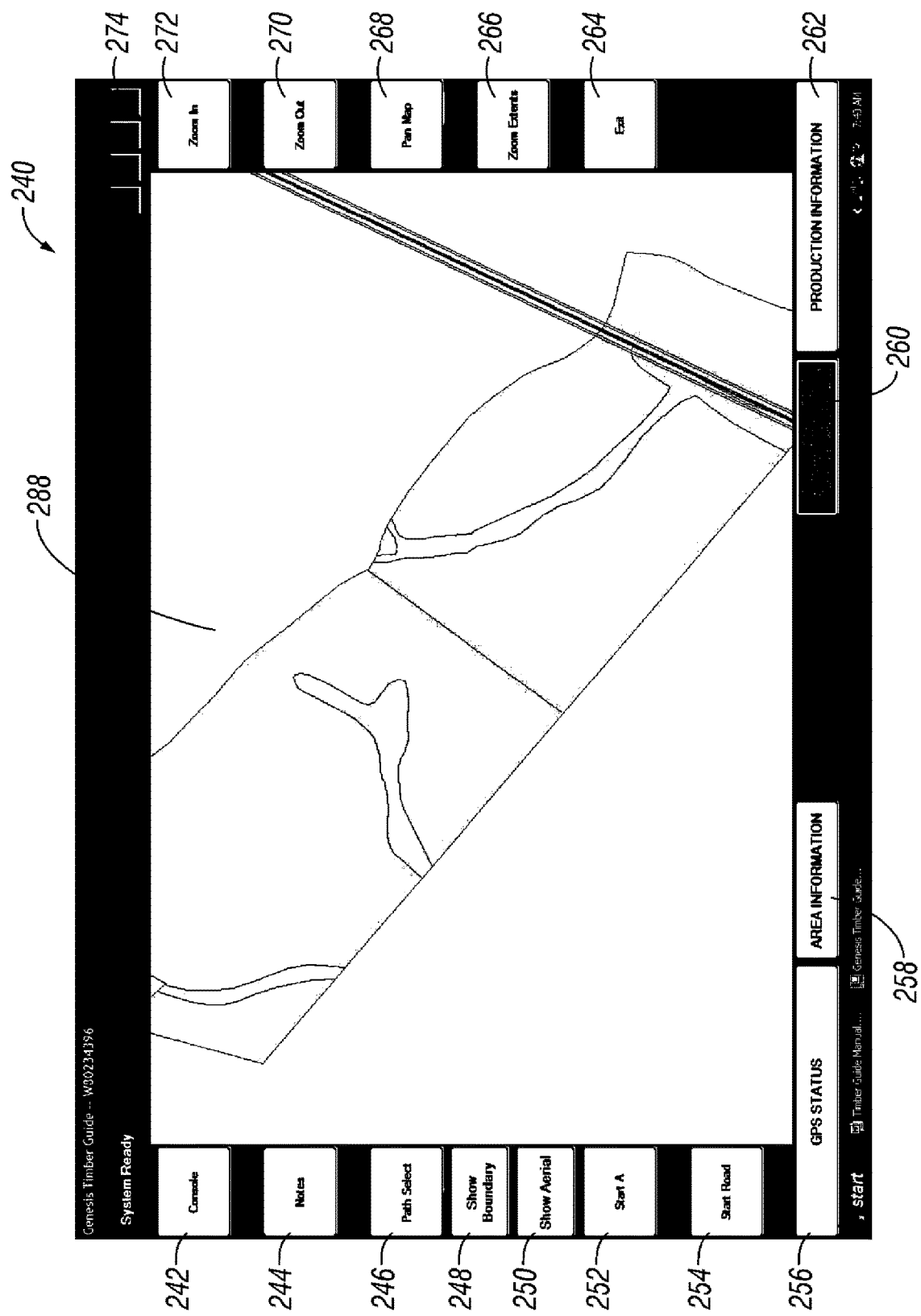

As shown in FIG. 7G, the Harvest screen shot 288 the red line is distance between two points (1,686 ft/0.32 mi.).

Figure 8A:
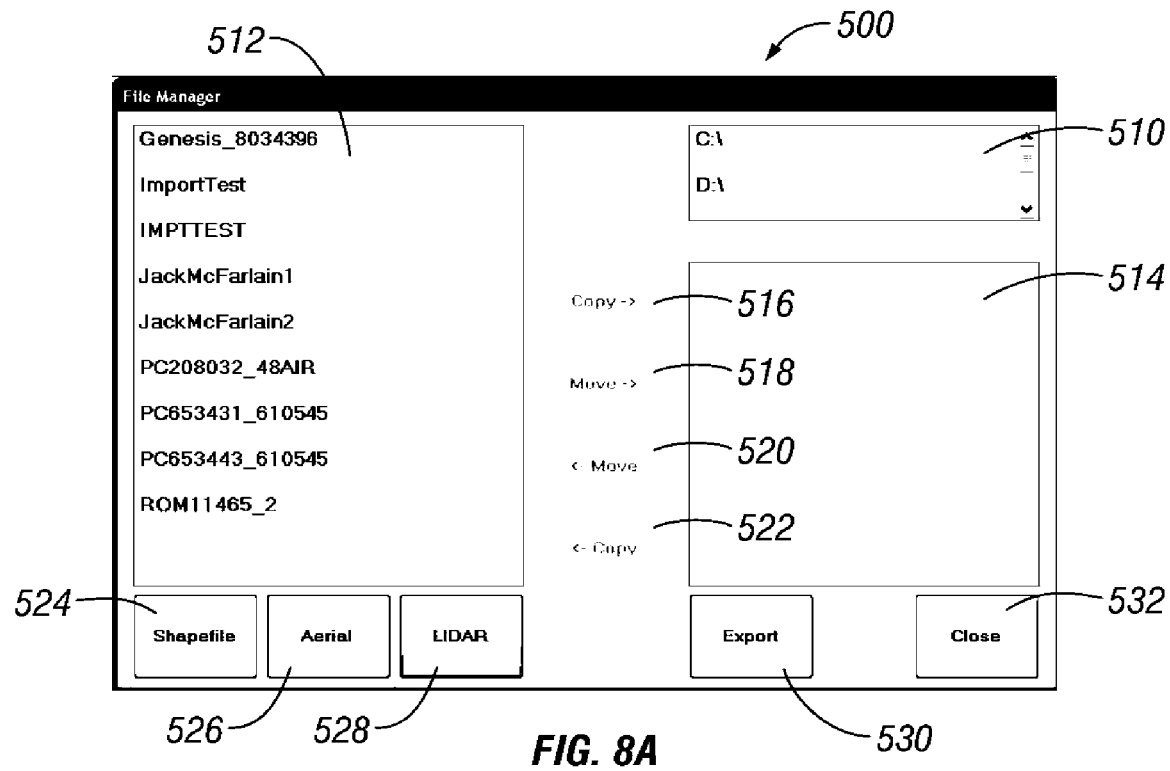
FIG. 8A-E provide screen displays associated with the GIS application.

As shown in FIG. 8A, the File Manager screen 500, which is selected by pressing File Manager button 218 from the Settings/Configuration screen 210 has twelve components, an import/export file source selection box 510, a left-hand file box 512, a Move right button 518, a Copy right button 516, a Move left button 520, a Copy left button 522, a right-hand file box 514, a Shapefile button 524, a Aerial button 526, a LIDAR button 528, an Export button 530, and a Close button 532. The File Manager screen 500 provides several means of file management. A previously created *.gtg file which is the complete harvest file for the system. Conversely the *.gtg harvest files can be copied/moved to a jump drive for post processing. New jobs can be created on the Timber Guide system and then import individual Shape files, Aerial files (*.sid), and/or LIDAR/elevation files (*.dem). The file manager also allows the operator to export 530 relatively small shape files from the system for easy data transfer. The export option may be used for data transfer if aerial and/or LIDAR images are being utilized in the *.gtg harvest file. In order to import shape, aerial, and/or LIDAR files, they need to be in individual sub-directories on the jump drive labeled as follows in the following format: shapefiles—standard format (6 files), aerials—*.sid+utm datum, LIDARS—*.dem+utm datum. To import a file, insert a USB jump drive into the USB port, select jump drive source from the import/export file source selection box 510, select desired destination file from the left-hand file box 512, press Copy left button 522 or Move left button 520 to place file in the Job Folder on computer. To export a file, insert a USB jump drive into the USB port, select jump drive source from the import/export file source selection box 510, select desired file from the left-hand file box 512, and press Copy right button 516 or Move right button 518 to place the file on the jump drive. Press the Close button 532 to return to the main screen 240.

Figure 8B:
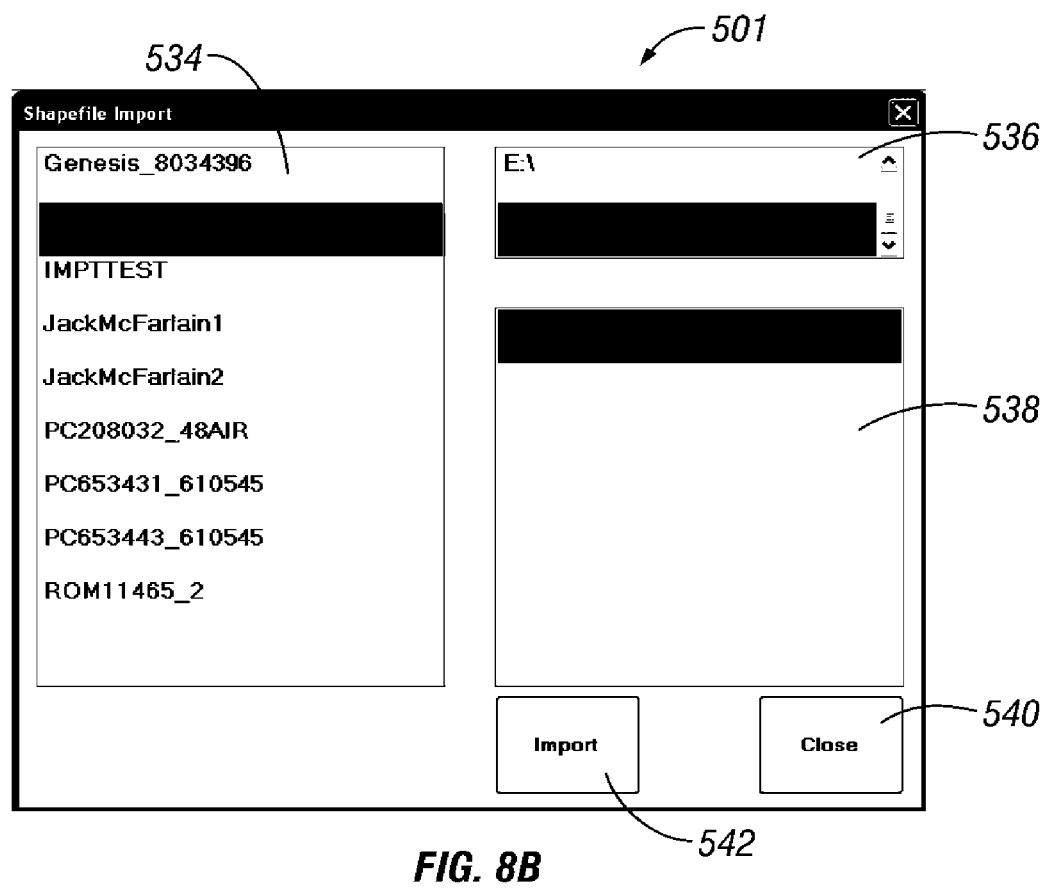

As shown in FIG. 8B, to import a shape file press the Shapefile button 524 on the File Manager screen 500. Select the drive containing the shape file from file source selection box 536, select the desired shape file (*.shp) from right-hand file box 538, select the desired job file (*.gtg) from the left-hand file box 534, and then press the Import button 542. Press the Close button 540 to return the File Manager screen 500.

Figure 8C:
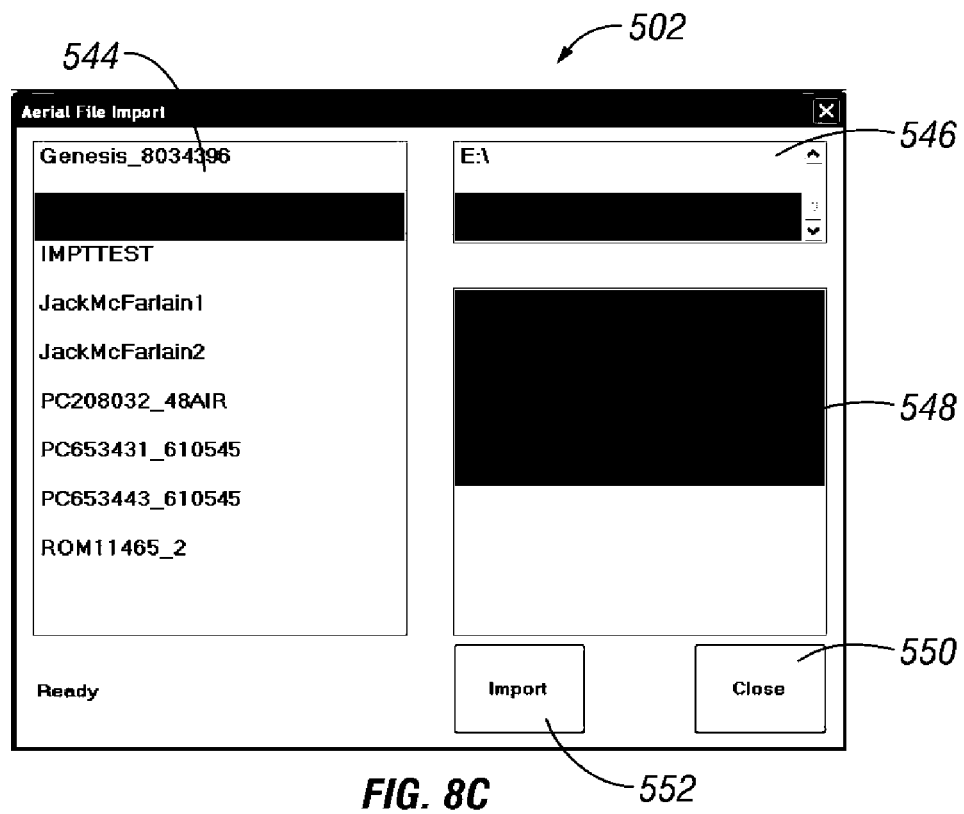

As shown in FIG. 8C, to import an aerial photo file press the Aerial button 526 on the File Manager screen 500. Select the drive containing the aerial photo file from file source selection box 546, select the desired shape file (*.sid) from right-hand file box 548, select the desired job file (*.gtg) from the left-hand file box 544, and then press the Import button 552. Up to four aelial photo files can be incorporated per job. Press the Close button 550 to return the File Manager screen 500.

Figure 8D:
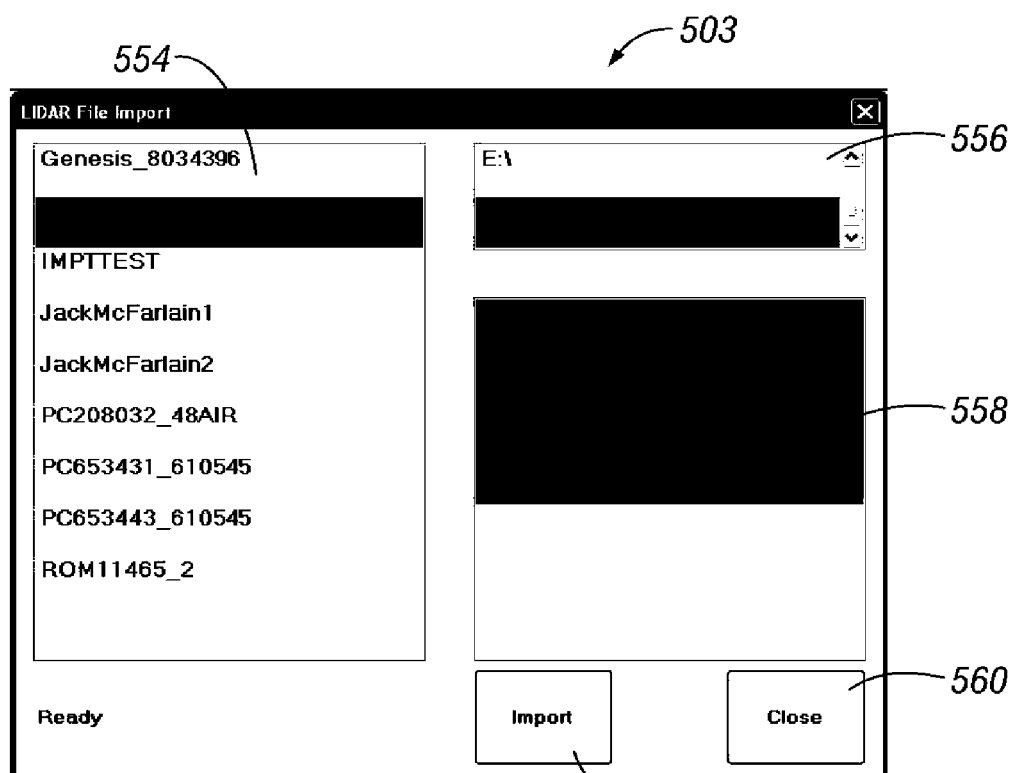

Refer to FIG. 8d, to import a LIDAR image file press the LIDAR button 528 on the File Manager screen 500. Select the drive containing the LIDAR image file from file source selection box 556, select the desired LIDAR image file (*.dem) from right-hand file box 558, select the desired job file (*.gtg) from the left-hand file box 554, and then press the Import button 562. Up to four LIDAR image files can be incorporated per job. Press the Close button 560 to return the File Manager screen 500.

Figure 8E:
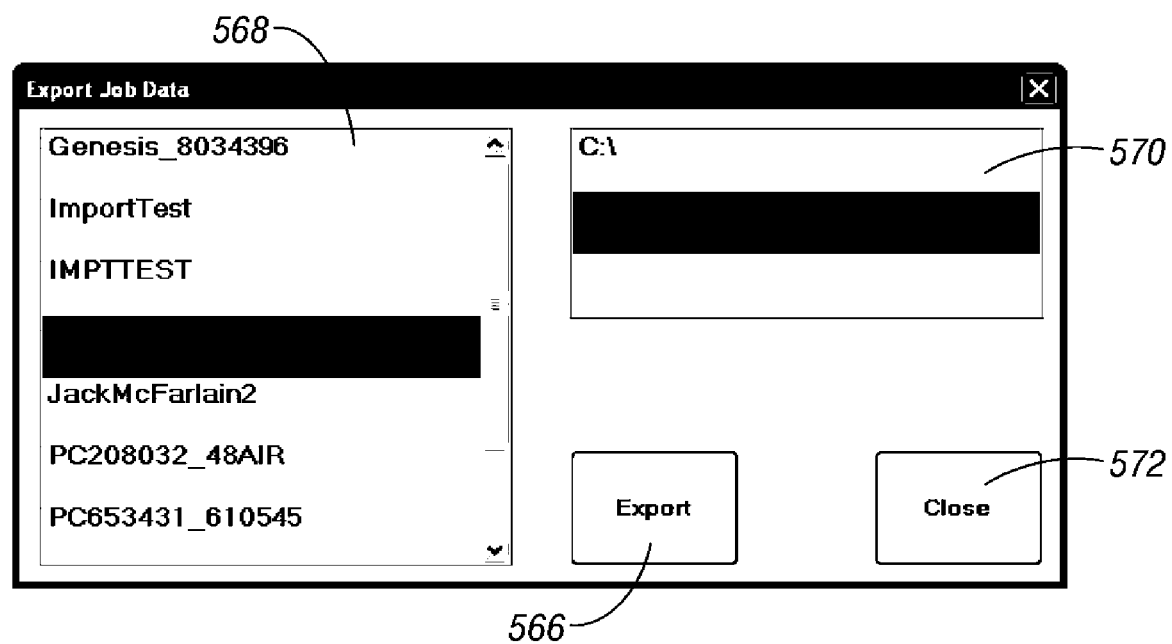

Refer to FIG. 8E, to export stored data layers as a compressed database file (*.gtg) press the Export Button— on the File Manager Screen 500. Select the desired job file (*.gtg) from the left-hand file box—, select the desired destination drive—, and then press the Export button. Press the Close button—to return to the File Manager Screen 500.

Figure 9:
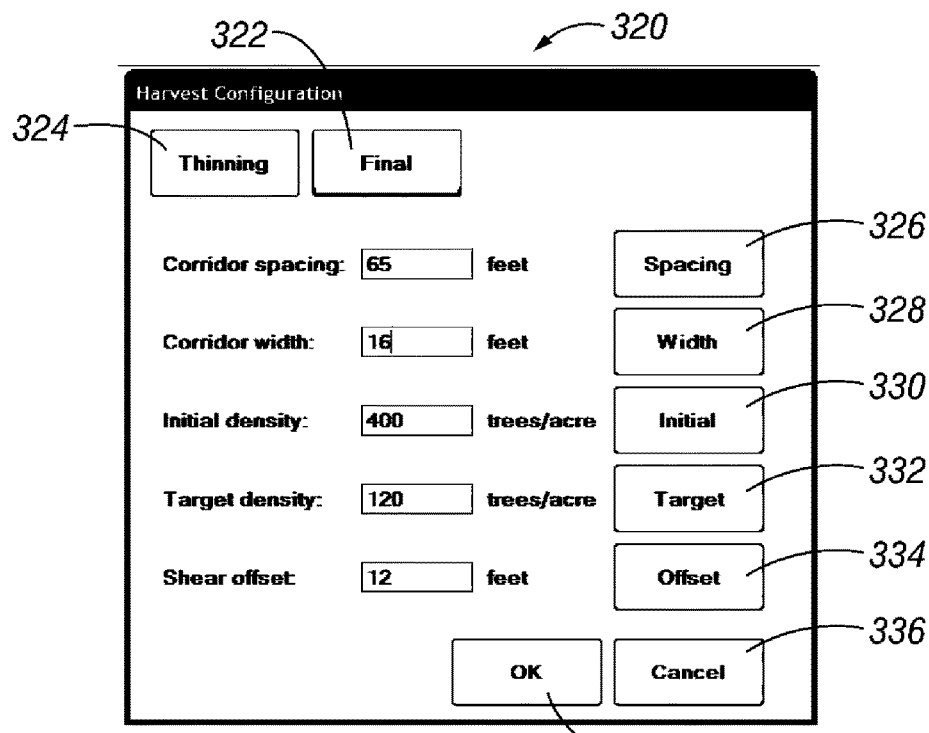
FIG. 9 is a screen display associated with a harvest configuration.

As shown in FIG. 9, the Harvest Configuration screen 320, which is selected by pressing the Harvest button 224 from the Settings/Configuration screen 210 has nine components, a Thinning button 324, a Final button 322, a Spacing button 326, a Width button 328, a Initial button 330, a Target button 332, an Offset button 324, an OK button 338, and a Cancel button 336. The Harvest Configuration screen 320 allows you to choose a thinning operation or final harvest. Pressing the Thinning button 324 gives setup guidance for spacing of corridor/down row centers by tapping Spacing button 326, width of corridor/down row by tapping Width button 328, initial stand density (theoretical tress/acre) by tapping Initial button 330, target stand density (desired trees/acre) by tapping Target button 332, shear offset tells computer the distance the saw head is in front of the GPS antenna by tapping Offset button 324. Pressing the Final button 322 tells the computer to perform a final harvest and removes thinning parameters. Press the OK button 338 to confirm setup and return to the main screen 240.

Pressing the Console button 242 will bring up the Operator Settings/Configuration Screen 210, as shown in FIG. 5B.

Figure 10:
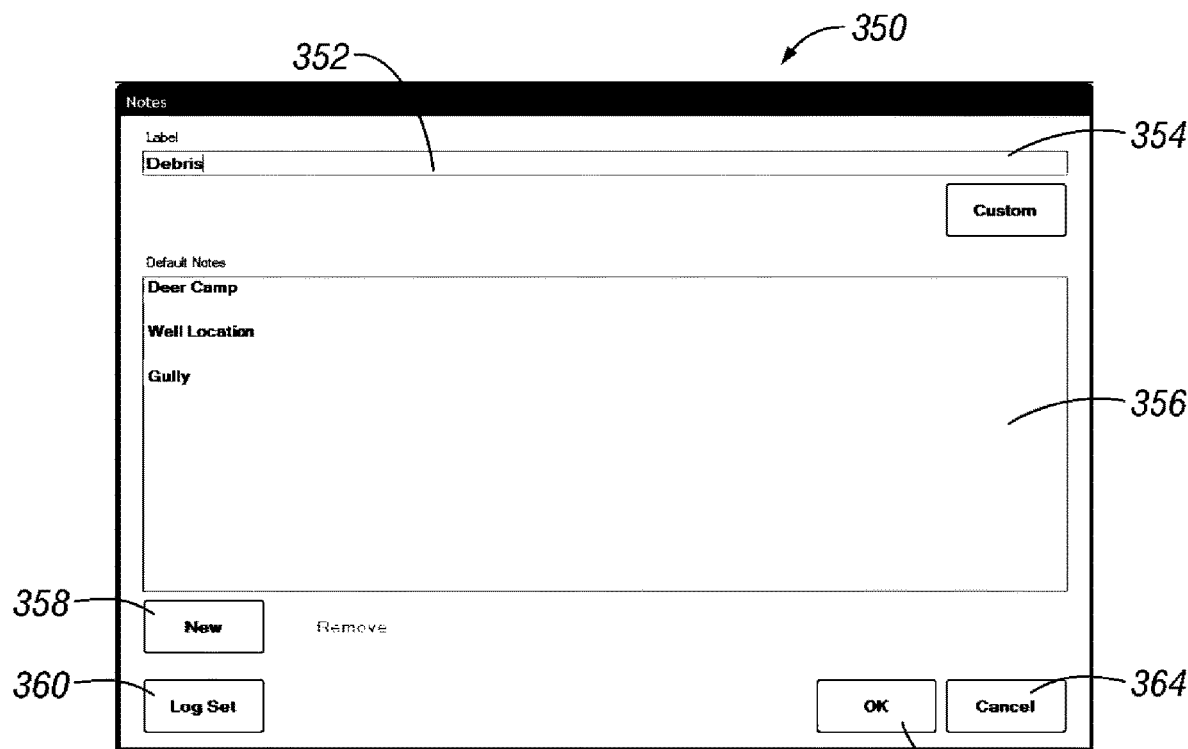
FIG. 10 is a notes interface screen display.

Pressing the Notes button 244 located on the main screen 240 brings up the Notes Interface page 350. The Notes Interface allows the user to mark and enter observations or areas of concern or interest during harvest, and create frequently used "marker" names, for example, Well Location, Deer Camp, Trash Pile, Gully, etc. Refer to FIG. 10, the Notes Interface page 350 has seven components, a Label box 352 which allows the operator to mark point(s)-of-interest (POI) locations by pressing the Custom button 354 to access the on-screen keyboard, a Default Notes box 356 for frequently used notations, a New button 358 to create frequently used notations, a Log Set button 360 which is a custom marker (rectangle with flag) to mark set location.

Pressing the Path Select button 246 located on the main screen 240 displays current and previously created guidance paths. This function allows the user to change from the current guidance path to any guidance paths previously created by tapping the desired path. Referring to FIG. 7b, the Harvest screen shot 278 shows three previous path directions along with current harvest path.

Pressing the Show Boundary button 248 located on the main screen 240 displays current boundary of tract shape. Referring to FIGS. 7c and 7d, the Harvest screen shot 280 shows tract shape file toggled on/off.

Pressing the Show Aerial button 250 located on the main screen 240 displays current boundary of photograph. Referring to FIG. 7e, the Harvest screen shot 284 shows tract with tract shape file toggled on and aerial photograph toggled off.

The Start A button 252 located on the main screen 240 creates an A-Bline. After selecting, button changes to green, upon turning green, either close the accumulator/gather arm or tap a point on the screen to mark start point A. The Start A button 252 changes to End B. After reaching the end of current path, select the End B button to mark the end point of A-Bline by using the accumulator/gather arm or tap desired endpoint on screen after button turns green.

Pressing the Start Road button 254 located on the main screen 240 will allow the operator to map highways, gravel roads, or wood trails while driving down them or while creating new roads or paths. After selecting the Start Road button 254, the button changes to End Road. The user will select Start Road to start mapping and select End Road to quit mapping.

Figure 11:
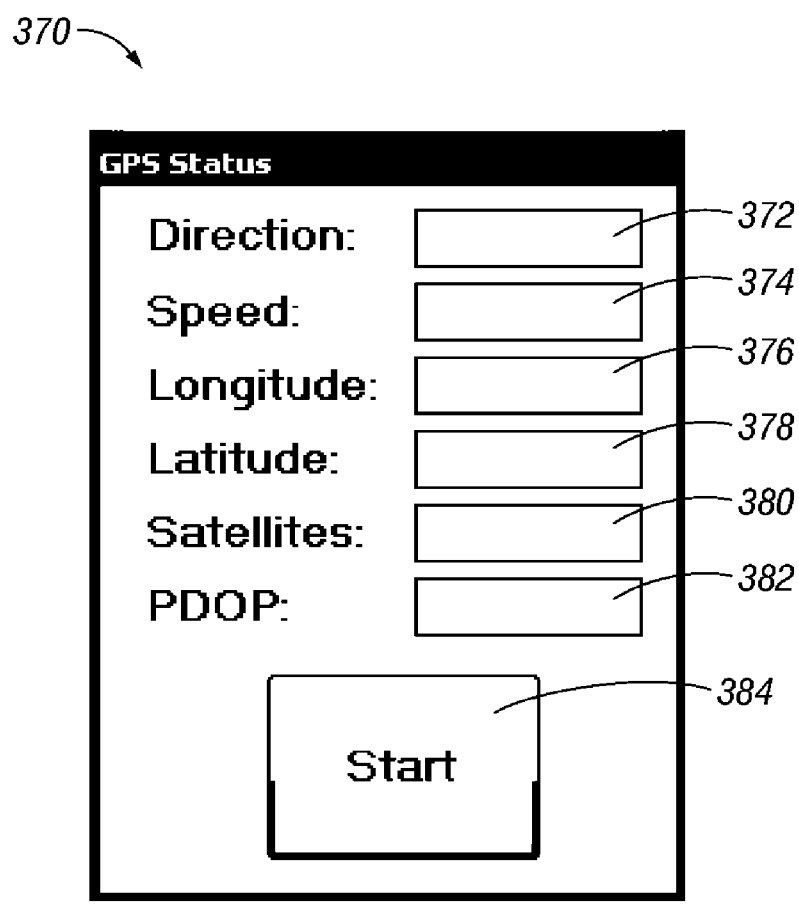
FIG. 11 is a OPS status screen display.

Pressing the GPS STATUS button 256 located on the main screen 240 brings up the GPS STATUS page 370 providing GPS position data. The GPS STATUS page 370 initiates the computer to start receiving and collecting data from the GPS receiver. Refer to FIG. 11, the GPS STATUS page 370 has seven components, a Direction box 372 when moving in a consistent direction will give you a compass beating (0-359°), a Speed box 374 which indicates ground speed in mph, a Longitude box 376 which indicates location east to west, a Latitude box 378 which indicates location north to south, a Satellites box 380 which indicates the number of satellites detected, PDOP—Precise Dissolution of Precision box 382 which indicates the quality of satellite data, and a Start button 384 which must be pressed for the computer to start receiving and collecting data from the GPS receiver. The Start button 384 will change to stop after being selected. Pressing the Stop button will stop GPS data collection.

Pressing the AREA INFORMATION button 258 located on the main screen 240 allows the operator to select points on the screen (bar turns green) to create a polygon shape with straight edges (no curves) on the screen to determine acres. Acres will be displayed in area information bar. Select bar again to turn off. Refer to FIG. 7f, the Harvest screen shot 286 shows area highlighted to determine area.

Pressing the DIST. INFORMATION button 260 located on the main screen 240 will aid in laying out log sets and skid lengths. Upon selecting the DIST. INFORMATION button 260 turns green. Tap beginning and endpoints on screen. A red line will mark measured distance. Pressing the DIST. INFORMATION button 260 will provide distance in feet and miles. Referring to FIG. 7g, the Harvest screen shot 288 shows red line is distance between two points (1,686 ft/0.32 mi.).

Figure 12:
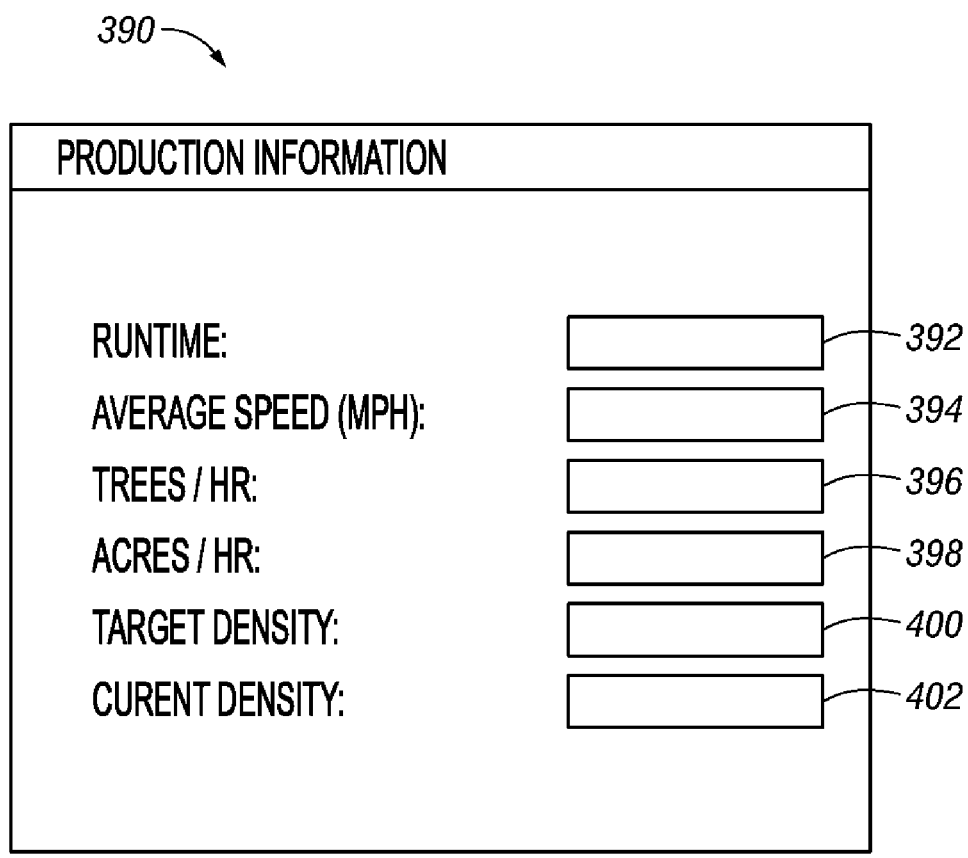
FIG. 12 is a Production Information screen display.

Pressing the PRODUCTION INFORMATION button 262 located on the main screen 240 brings up the PRODUCTION INFORMATION page 390 allowing the operator to view productivity data. Referring to FIG. 12, the PRODUCTION INFORMATION page 390 has six components, a Runtime box 392 which indicates a running total of machine hours spent harvesting, a Avg. Speed (mph) box 394 which indicates average travel speed, a Trees/hr box 396 which indicates a running calculation of average trees harvested per hour, a Acres/hr box 398 which indicates a running calculation of acres harvested per hour, a Target Density box 400 which indicates the desired final stand density (entered in the Harvest screen 320), and a Current Density box 402 which indicates a running calculation based on number of trees currently removed from a given area versus the initial theoretical stand per acre. Of course, other types of calculations may be used which are indicative of production.

Pressing the Zoom In button 272 located on the main screen 240 allows the operator to incrementally increase the magnification of the current map view.

Pressing the Zoom Out button 270 located on the main screen 240 allows the operator to incrementally decrease the magnification of the current map view.

Pressing the Pan Map button 268 located on the main screen 240 allows the operator to select a point on the map and drag the map to view different areas.

Pressing the Zoom Extents button 266 located on the main screen 240 allows the operator to zoom out to view the entire map or shape file.

Pressing the EXIT button 264 located on the main screen 240 closes the Harvest screen 276.

The main screen 240 has four Status Indicator lights 274 located in the upper right-hand of the screen. The first indicator light on the left changes from red to green when the computer is communicating with the GPS receiver. The second indicator light changes from red to green when the computer is collecting data. The third indicator light changes from red to green when the accumulator/gather finger is closed (tree has been harvested). The fourth indicator light changes from red to green when the bundle of trees is laid down. The third and fourth status indicator lights may be indicative other functions performed by other pieces of equipment on which the system may be installed.

Figure 13:
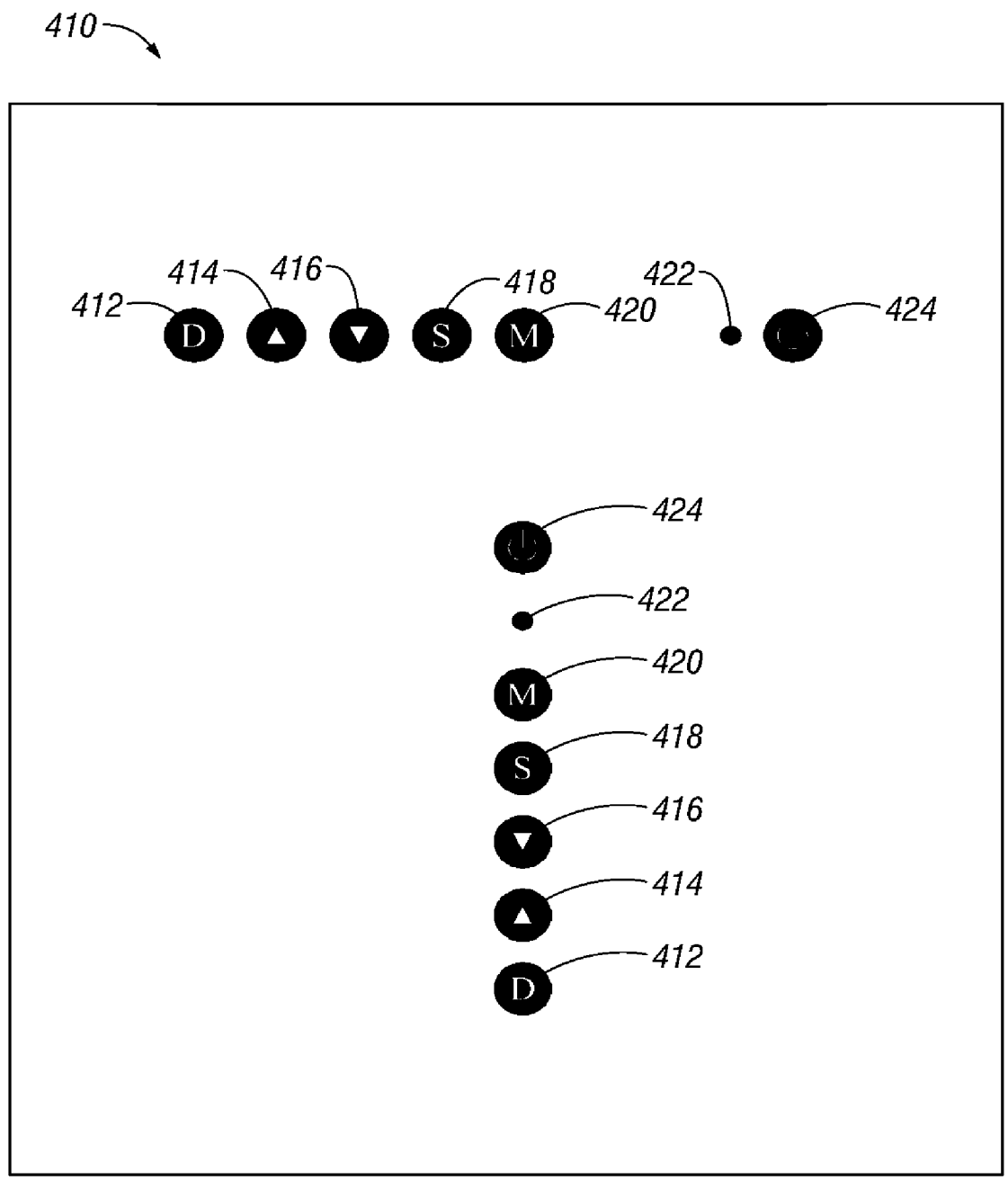
FIG. 13 is a monitor screen display.

As shown in FIG. 13, the monitor 410 has six interface buttons and an indicator LED. The D button 412 is a dimmer toggle with low, medium and high settings. The• (UP) button 414 is the up arrow which increases menu settings. The T (DOWN) button 416 is the down arrow which decreases menu settings. The S button 418 is used to toggle sources between computer, AV1 and AV2. The M button 420 is for menu options. The screen status indicator 422 is red when the screen is off and green when the screen is on. The screen power button 424 toggles the monitor on and off.

Figure 14:
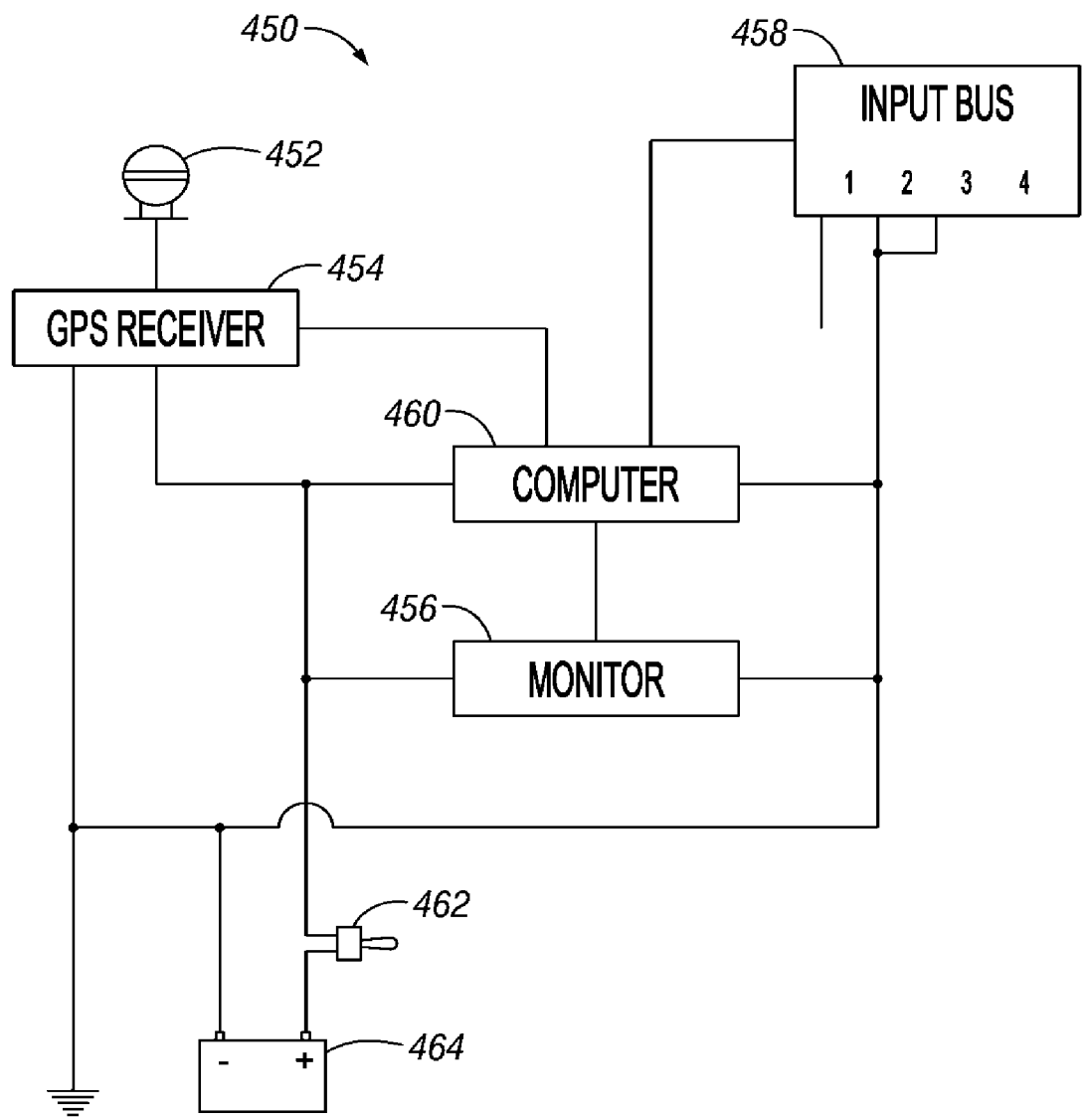
FIG. 14 is a block diagram showing one embodiment of a machine

Forest harvesting equipment control interconnects 450, refer to FIG. 14. The GPS antenna 452 coaxially coupled to GPS receiver 454. The GPS receiver 454 communicates with computer 460 serially via DB9 connector. The computer 460 communicates with the LCD touch panel 456 graphics port the via DB15 connector. Also, the computer 460 communicates with LCD touch panel 456 serially via the USB port connector. The computer communicates with the data acquisition device 458 serially via the USB connector. A 12V DC battery 464 is connected to all devices in the normal manner to one skilled in the art. In the case of 24V DC systems a 24V to 12V power inverter is incorporated into the system.

Thus, the present invention provides a GIS application available to the operator which can be used for a number of purposes. The onboard operator and equipment interface allows an operator access to all available property parcel GIS information. This allows for real-time documentation and mapping of forest management events and activities. Examples of features may include, on screen creation of polygons for area determination, distance measurement tools, remote sensing imagery, general topographical map overlays, guidance tools for standardizing travel path directions and spacing, equipment activity mapping points with associated time, date, and location information. Examples of such mapping points may include: harvested trees; laid down bundles of trees; trees per bundle laid down; retrieved bundles of trees with associated tree count; loaded forestry products; delivered forest products; creek (SMZ) crossing points; road system construction and utilization; use frequency in equipment traffic zones; snow grooming areas and activities; fire line construction and maintenance; gas pipeline or utility construction areas; mapping of discovered invasive or exotic plant areas; mapping of discovered endangered plant and animal species; extrapolated areas of excessive wheel slip, rutting or environmental disturbance; corrective best management practices (BMP's); construction of water bars; road or log set maintenance; and SMZ crossing maintenance. Of course numerous other types of mapping points may be recorded which are associated with machine operations or observations of an operator of a machine.

Thus, the present invention allows for reduction in timber company and contractor labor cost by utilizing stand mapping, boundary marking, pre-harvest and reforestation orientation, documentation time, logging and application supervision, and liability cost of labor. The invention will also minimize timber production input costs while maximizing operations equipment value by minimizing product waste, reducing tillage procedures, and VRT (Variable Rate Technology) for fertilization and vegetation management. Another aspect of the present invention relates to an increase in forest productivity by using true documentation of harvest acres and yield, optimizing stand density with harvest mapping systems, and VRT (Variable Rate Technology) use in applying fertilizer and herbicides. An increase in silvicultural equipment productivity by using shape file maps for mid-rotation procedures, integrating topographical mapping to maximize contour tillage, using VRT (Variable Rate Technology) information generated from harvest equipment, and integrating emerging LIDAR information. Also an increase of production for harvest equipment by using GIS boundary delineations, GPS terrain and environmental hazards, yield mapping, and coordination of harvesting equipment, for example, tree harvest, log skidding, and hauling.

Another aspect of the present invention relates to providing greater environmental protection by creating an accurate delineation of SMZ's (Streamside Management Zones) and ephemerals. Using alerts for excess slippage/rutting. Accurate documentation of SMZ (Streamside Management Zone) crossings throughout the harvesting tract. Utilizing topographical maps, LIDAR imaging, and GPS to minimize environmental impacts.

Another aspect of the present invention is logistics monitoring (log Set to Mill). GPS determined routing is given to truck at dispatch point or via cellular link. Data log of routes, speed and time stopped. An electronic tag given to load at log set which includes location, owner, job number, and time and date stamp. Real-time harvest updates.

Another aspect of the present invention is harvest monitoring. A machine sensor operatively connected to shear equipment may be used to collect tonnage data on the go which includes productivity information and yield data for VRT (Variable Rate Technology) fertilization prescriptions. A slippage monitor may be used whereby the ground speed from driveline sensor is compared to GPS ground speed to develop percentage slip information which will provide some correlation to rutting.

Another aspect of the present invention is topographical based thinning optimization patterns. This is accomplished by developing topographical maps based on LIDAR imaging, and also developing optimized harvest patterns from topographical data.

One of the advantages the present invention is providing a simplified interface to a powerful GIS application. The simplified interface is suitable for use by an operator of a machine conducting operations on a land base, such as through the use of a touch screen display. Yet, the underlying GIS application is powerful enough and flexible enough to perform functions associated with a GIS application. Thus, an operator can see numerous data layers associated with the land base and available information.

IV. Reporting

The present invention further provides for reporting which may occur during or after field work associated with the land base. The reporting may be used for numerous purposes, including documentation, planning purposes, compliance purposes, valuation of a land base, evaluation of productivity of workers or equipment as well as numerous other purposes related to direct interaction of equipment and people with land and natural resources.

According to another aspect of the present invention, the data collected with operations such as timber harvesting may be evaluated to determine the productivity of loggers or others who perform harvesting operations. The present invention contemplates any number of types of reports. Examples of productivity reports include daily, weekly, and whole-tract productivity reports. A daily productivity report may show a map of the land base and associated data points for particular types of operations. The daily productivity report may include production time as a percent of each hour spent actually harvesting. Maximum, minimum, and averages may be given for the day. Another measure of daily productivity may be number of trees harvested each hour. Maximum, minimum and average values may be given. Yet another measure of daily productivity may be the number of trees harvested per hour. Maximum, minimum, and average values may be given. In addition, the number of acres harvested may be given as well as other information which is indicative of productivity. Data may be presented in any number of formats, including as tables, bar graphs, line graphs, or other formats.

A daily, weekly, monthly, quarterly or other type of time-period based productivity report may include a map of the land base and associated data points for particular types of operations. The weekly productivity report may include production time as a percent of each hour spent actually harvesting. Maximum, minimum, and averages may be given for the day. Another measure of weekly productivity may be number of trees harvested each hour. Maximum, minimum and average values may be given. Yet another measure of weekly productivity may be the number of trees harvested per hour. Maximum, minimum, and average values may be given. In addition, the number of acres harvested may be given as well as other information which is indicative of productivity. Data may be presented in any number of formats, including as tables, bar graphs, line graphs, or other formats.

A tract productivity report may include a map of the land base and associated data points for particular types of operations. The tract productivity report may include production time as a percent of each hour spent actually harvesting. Maximum, minimum, and averages may be given for the day. Another measure of tract productivity may be number of trees harvested each hour. Maximum, minimum and average values may be given. Yet another measure of tract productivity may be the number of trees harvested per day. Maximum, minimum, and average values may be given. In addition, the number of acres harvested may be given as well as other information which is indicative of productivity. Data may be presented in any number of formats, including as tables, bar graphs, line graphs, pie charts, or other formats. Maps may accompany the data to provide additional context for the data.

Thus, reporting may provide for determining the operating efficiency of equipment with regards to the performance of the exact task for which said equipment was designed vs. actual total time of operation over any pre- or post-determined period of time. For example the reporting may include tree retrieval equipment time spent retrieving vs. total time operating or specific task operation of equipment vs. total operating time of equipment.

In addition to productivity reports, the present invention contemplates that other types of reports may be prepared based on the information V. Fire Suppression on a Land Base Another embodiment of the present invention relates to fire suppression and management of fires on a land base. Machines associated with fire fighting may be equipped with the GIS application to collect, send, and receive information related to a fire and the land on which the fire is located. This may include information regarding timber on the land base, stream management zones, roads, and other boundaries. This information may also include the location of individuals, other pieces of equipment, or the location of other resources used to fight or suppress the fire, or the location and/or movement of the fire itself. The invention may also aid in the suppression and planning of fire fighting activities by providing real-time information concerning the fire and real-time location of personnel and equipment to other personnel, equipment, or centralized dispatching location. Having appropriate information at the location and time of need is advantageous for a number of reasons, including efficiency, effectiveness, and safety. Where the present invention is used in fire suppression activities, the GIS application is configured to include layers associated with fire suppression. The GIS applications may be run on computers operatively connected to various types of machines associated with fire suppression activities or which support fire suppression activities. Examples of machines which may be used in fire suppression activities include, but are not limited to, bull dozers, fire plows, ATV's, tractors, water vehicles, and/or other suppression equipment. Examples of sensors used may include contact or position sensors associated with a bulldozer blade, fire plow, or flowmeters attached to a water truck or other piece of equipment used to deliver chemical or liquid fire suppression substance. The invention will dramatically increase the safety of individual personnel through the use of personal locator tags/beacons/transmitters whether with or without GPS enablement. This increased level of safety will come by providing real-time data concerning the location and direction of travel of individual firefighters or crews, by transmitting said information to and through other pieces of equipment on which the invention is installed to the centralized dispatching location.

VI. Utility/Right-of-Way Management

Another application of the present invention relates to utility management. Utilities such as, but not limited to gas lines, power lines, and water lines have problems in terms of collecting and documenting information concerning the type and extent of invasive species encroachment as well as mechanical operations for vegetation and soil erosion management. Utility management has many problems similar to those experienced in forestry management from the standpoint of collecting accurate information and documenting operations performed on utility right-of-ways. Where used for utility management, the GIS application may be configured with data layers for use in support of utility management activities.

Examples of machines associated with utility management include machines for brush cutting, mulching, machines associated with station management, mowers, machines associated with tree trimming, bull dozers, tractors, ATVs, marsh buggies, and other types of machines.

Examples of types of sensors include sensors for determining when a cutting operation is performed, sensors for determining when a dirt moving operation is performed, or other type of sensors.

VII. Slope and Snow Management

Another application of the present invention relates to slope and snow management such as may be performed by a ski resort or ski recreational area. In slope and snow management, considerable efforts are expended grooming ski slopes, making "snow", construction, maintenance, and design of snow and/or terrain parks, identifying and protecting skiers from hazards, and related activities. The management of the slopes, another type of land base, may benefit from the present invention where the GIS application is configured for slope and snow management with appropriate data layers. Examples of types of machines include snow cats with grooming attachments, blades, or snow blowers. Examples of sensors used may include contact or position sensors associated with snow cat blade or blower. Sensors may be used to detect when moving snow, or changing terrain. People on the ground may include mountain or trail maintenance personnel, ski patrol or emergency patrol, or others. The invention may dramatically increase the safety of individual personnel through the use of personal locator tags/beacons/transmitters whether with or without GPS enablement. This increased level of safety will come by providing real-time data concerning the location and direction of travel of individuals working in ski areas, by transmitting said information to and through other pieces of equipment on which the invention is installed to the centralized dispatching location.

The present invention may be used for management of a land base for any number of purposes. A preferred embodiment has been described with respect to performing timber or forestry related applications. However, there are numerous other examples of land management activities with which the present invention may be used. These include land management activities associated with agricultural, land management activities associated with environmental monitoring or management, land management activities associated with fires suppression, land management activities associated with managing land for use as a ski area or other type of recreational uses.

What is claimed is:

1. A system for timber management on a land base, comprising:
   a timber management machine;
   a computing device for use in the timber management machine;
   a touch screen display operatively connected to the computing device for use by an operator of the timber management machine;
   a geoposition determining device in communicating with the computing device for determining position of the timber management machine;
   a plurality of machine sensors associated with machine operations of the timber management machine;
   an interface operatively connected to the computing device for operatively connecting the plurality of machine sensors associated with machine operations of the timber management machine to the computing device;
   a software application executing on the computing device, wherein the software application provides for:
   (a) displaying a geographic information system (GIS) module on the touch screen display, the GIS module adapted to display a map and a plurality of data layers on the map;
   (b) providing a user interface on the touch screen display, the user interface providing for:
   (1) using a distance measurement tool to provide onscreen distance measurement using the touch screen display;
   (2) using an area measurement tool to provide for onscreen area measurement using the touch screen display;
   (3) generating land management alerts and displaying the land management alerts on the touch screen display; and
   (4) displaying machine operations from one or more of the plurality of machine sensors on at least one of the plurality of data layers.

2. The system of claim 1 wherein the generating land management alerts comprise providing alerts when land boundaries are crossed.

3. The system of claim 2 wherein the user interface further provides for selecting one or more of the plurality of data layers for display on the map.

4. The system of claim 3 wherein the plurality of layers include:
   (a) a skidder data layer for the skidder data;
   (b) a feller buncher data layer for the feller buncher data; and
   (c) a loader data layer for the loader data.

5. The system of claim 1 wherein the interface is a bus interface.

6. The system of claim 1 wherein the timber management machine is a skidder.

7. The system of claim 1 wherein the timber management machine is a feller buncher.

8. The system of claim 1 further comprising a wireless transceiver operatively connected to the computing device and wherein the computing device is configured to receive data from forestry equipment and display the data on the map of the GIS application.

9. The system of claim 1 wherein the GIS application further comprises at least one data layer consisting of location of workers, location of machines, a tract shape file, an aerial image, a LIDAR topography, corridor guidance lines, trees harvested, timber bundles laid down, timber bundles picked up, road mapping, tonnage yield monitoring, environmental impact data, stream management zone data, endangered species data, invasive species data, environmental hazard data, wheel slippage data, sustainable forestry initiative data, or combinations thereof.

10. The system of claim 1 wherein the user interface further provides for showing current location of the timber management machine.

11. A system for timber management of a land base, comprising:
   a computing device;
   a touchscreen display operatively connected to the computing device;
   a geoposition determining device in operative communication with the computing device;
   an interface operatively connected to the computing device for communicating machine sensor data from machine sensors to the computing device;
   a GIS application executing on the computing device;

wherein the GIS application provides for displaying a map showing a current location determined by the geoposition determining device and a plurality of layers of data on the map;

wherein the GIS application provides an onscreen distance measurement tool to assist the user in performing work operations on the land base by calculating distance between two points selected by the user through the touchscreen display;

wherein the GIS application provides for associating map points with the machine sensor data and displaying machine sensor data for work operations for at least one of skidder data, feller buncher data, and loader data to the user;

wherein the at least one of skidder data, feller buncher data, and loader data shows the user the real time land base operations of a separate user located in a skidder, feller, or loader;

wherein the GIS application provides for generating land management alerts and displaying the land management alerts on the touch screen display.

12. The system of claim 11 wherein the plurality of layers include:
(a) a skidder data layer for the skidder data;
(b) a feller buncher data layer for the feller buncher data; and
(c) a loader data layer for the loader data.

13. The system of claim 11 further comprising a wireless transceiver operatively connected to the computing device and wherein the computing device is configured to receive data from forestry equipment and display the data on the map of the GIS application.

14. A system for management of a land base, comprising:
a software application executing on a computer system comprising a computer, a touch screen display operatively connected to the computer, a wireless transceiver operatively connected to the computer and a geoposition determining device operatively connected to the computer;
wherein the software application provides for:
(a) displaying a GIS module on the touch screen display, the GIS module adapted to display a map and a plurality of data layers on the map, wherein at least one of the plurality of data layers is indicative of land management operations;
(b) providing a user interface on the touch screen display, the user interface allowing for:
(1) using a distance measurement tool to allow for onscreen distance measurement using the touch screen display;
(2) using an area measurement tool to allow for onscreen area measurement using the touch screen display;
(3) selecting one or more of the plurality of data layers for display on the map;
(4) receiving data including operator notes and activity events associated with operation of equipment;
(c) generating land management alerts and displaying the land management alerts on the touch screen display; and
(d) associating machine data from machine sensors with position information from the geoposition determining device and displaying on one of the plurality of layers the data from the machine sensors.

15. The system of claim 14 wherein the step of generating land management alerts comprises providing an alert when a land boundary is crossed.

16. The system of claim 15 wherein the user interface further allows for selecting a land management operation to perform.

17. The system of claim 16 wherein the software application further provides for importing one or more additional data layers.

18. The system of claim 17 wherein the step of importing comprises connecting to a remote server through the wireless transceiver and importing the one or more additional data layers from the remote server.

19. The system of claim 18 wherein the step of importing comprises wirelessly connecting to a second computer system and importing the one or more additional data layers from the second computer system.

* * * * *